Nov. 3, 1959 A. J. MALAVAZOS ET AL 2,911,142

DUPLEX RECORDING CALCULATOR WITH VALUE TRANSFER MECHANISM

Filed May 25, 1954 19 Sheets-Sheet 5

DUPLEX RECORDING CALCULATOR WITH VALUE TRANSFER MECHANISM

Filed May 25, 1954 19 Sheets-Sheet 6

Nov. 3, 1959 A. J. MALAVAZOS ET AL 2,911,142

DUPLEX RECORDING CALCULATOR WITH VALUE TRANSFER MECHANISM

Filed May 25, 1954 19 Sheets-Sheet 9

Nov. 3, 1959 A. J. MALAVAZOS ET AL 2,911,142

DUPLEX RECORDING CALCULATOR WITH VALUE TRANSFER MECHANISM

Filed May 25, 1954 19 Sheets-Sheet 10

Nov. 3, 1959 A. J. MALAVAZOS ET AL 2,911,142

DUPLEX RECORDING CALCULATOR WITH VALUE TRANSFER MECHANISM

Filed May 25, 1954 19 Sheets-Sheet 11

DUPLEX RECORDING CALCULATOR WITH VALUE TRANSFER MECHANISM

Filed May 25, 1954

Nov. 3, 1959 A. J. MALAVAZOS ET AL 2,911,142

DUPLEX RECORDING CALCULATOR WITH VALUE TRANSFER MECHANISM

Filed May 25, 1954 19 Sheets-Sheet 14

Nov. 3, 1959 A. J. MALAVAZOS ET AL 2,911,142

DUPLEX RECORDING CALCULATOR WITH VALUE TRANSFER MECHANISM

Filed May 25, 1954 19 Sheets-Sheet 17

United States Patent Office 2,911,142
Patented Nov. 3, 1959

2,911,142

DUPLEX RECORDING CALCULATOR WITH VALUE TRANSFER MECHANISM

Arthur J. Malavazos, Oakland, and Nathaniel F. Hawthorne, Alameda, Calif., assignors to Friden, Inc., a corporation of California Application May 25, 1954, Serial No. 432,252

12 Claims. (Cl. 235—60.34)

INDEX

| | Column |
|---|---|
| I. Frame and Cover | 3 |
| II. Main Power Mechanism | 4 |
| III. Registers | 5 |
| IV. Register Drive Mechanism | 6 |
| V. Register Clearing Mechanism | 8 |
| VI. Tens-Transfer Mechanism | 10 |
| VII. Keyboard and Selection Mechanism | 11 |
| VIII. Live Key Mechanism | 14 |
| IX. Addition and Subtraction Control Mechanism | 18 |
| X. Printing Mechanism | 22 |
| XI. Control Keys | 26 |
| XII. Register Sensing and Back-Transfer Mechanism | 30 |
| XIII. Front Register Subtotal Printing Operation | 33 |
| XIV. Rear Register Subtotal and Total Printing Operation | 33 |
| XV. Positive and Negative Transfer Operation | 34 |

This invention relates to mechanical calculating machines, and more particularly to a listing adding machine having printing mechanism, two registers adapted to provide visual indications of accumulated values, and means for transferring values standing in one register into the other register.

It is among the objects of the invention to provide a mechanical calculating machine which is fully automatic in operation; which has a selection mechanism including a full keyboard at least some of the keys of which are live keys, the depression of any one of which is effective to establish an operating cycle of the machine; which has two registers, common actuator mechanism, and conditioning keys selectively depressible to condition the actuator mechanism to additively or subtractively enter values set up in the selection mechanism of the machine into either selected one of said registers upon depression of a live key of the keyboard; which has a repeat conditioning key effective in cooperation with any one of the additive and subtractive conditioning keys to repeatedly enter the same value into the selected register as many times as a live key of the keyboard is depressed while the repeat key is latched down, the last digit of the constant value being changed by the operator, if desired, by selection of different live keys of the keyboard; which has control keys and which includes a mechanism effective to establish a machine operating cycle whenever a control key is depressed without the necessity of also depressing a keyboard live key and which control keys are effective for printing total and subtotal values from either register and for additively or subtractively transferring accumulated values from one register to the other; which includes mechanism operating automatically under the control of the control keys to sense the valves sanding in either register and back transfer such values into the selection mechanism for transfer to the printing mechanism in the event a total or subtotal key is depressed, or to transfer the values from one register to the other in the event a transfer key is depressed; which includes rotatable actuator mechanism and rotatable control mechanism drivingly interconnected in such a manner that two rotations of the actuator mechanism occur for each single rotation of the control mechanism, whereby values can be entered into the registers and printed during the first portion of an operating cycle and the printing mechanism zeroized and, in some cases, at least one of the registers cleared during the latter portion of the same operating cycle; and which has operating cycles, each limited to a single rotation of the rotatable control mechanism and which accomplishes each operation thereof in a single operating cycle. While each of the above objects is considered to relate to a distinct invention, it is contemplated that invention may reside in various combinations thereof.

Other objects and advantages will become apparent from a consideration of the following description and the appended claims in conjunction with the accompanying drawings wherein:

Fig. 1 is a top plan view of a mechanical calculating machine illustrative of the invention;

Figs. 2 and 2*a* together constitute a longitudinal cross-sectional view of the selecting, actuating, registering and printing mechanism of the machine, such as taken along vertical planes indicated by the line 2—2*a* of Fig. 1;

Figure 4:
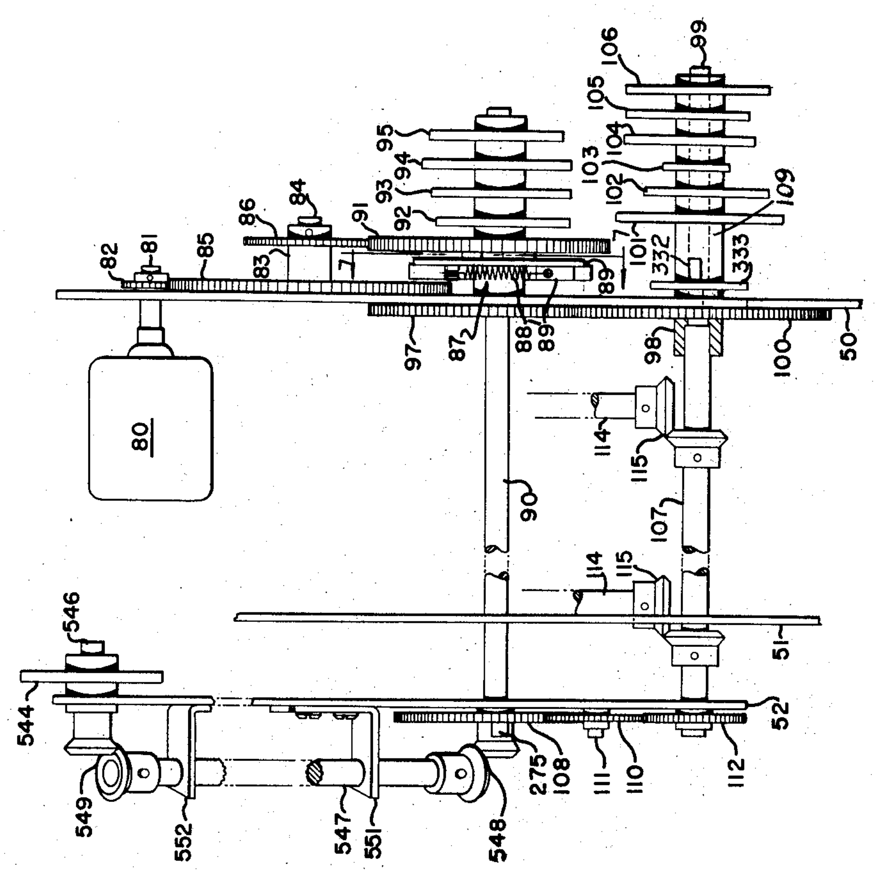
Fig. 4 is a diagrammatic top plan view of the driving mechanism of the machine with a portion broken away and shown in cross-section to better illustrate the construction thereof.
Figure 6:
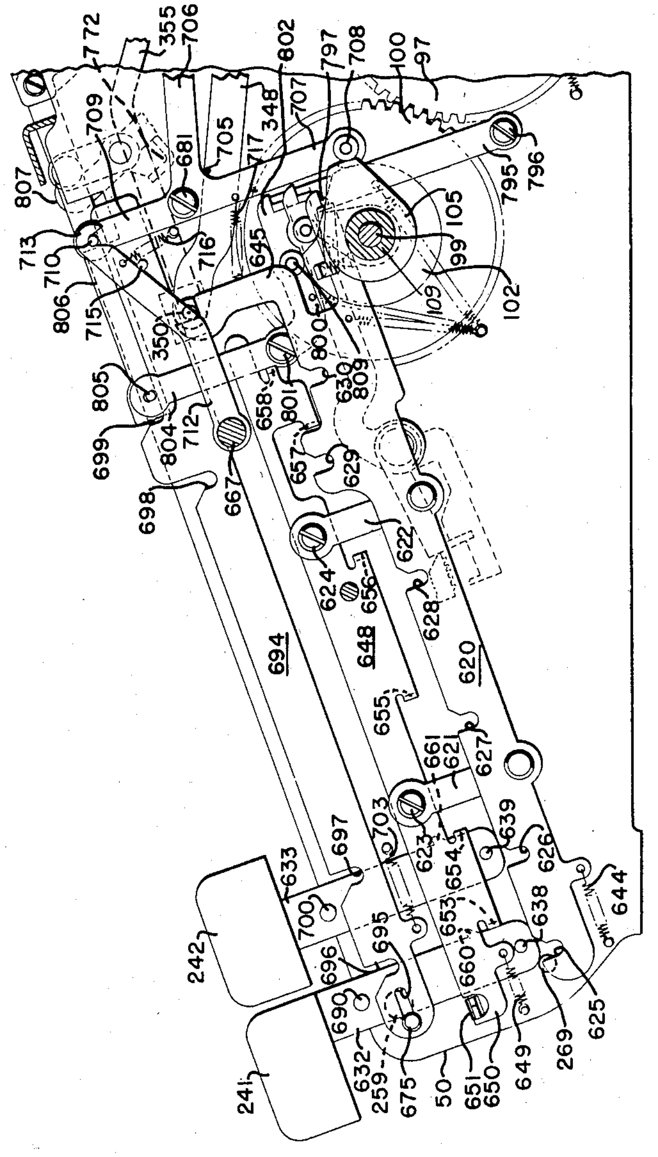
Figure 6A:
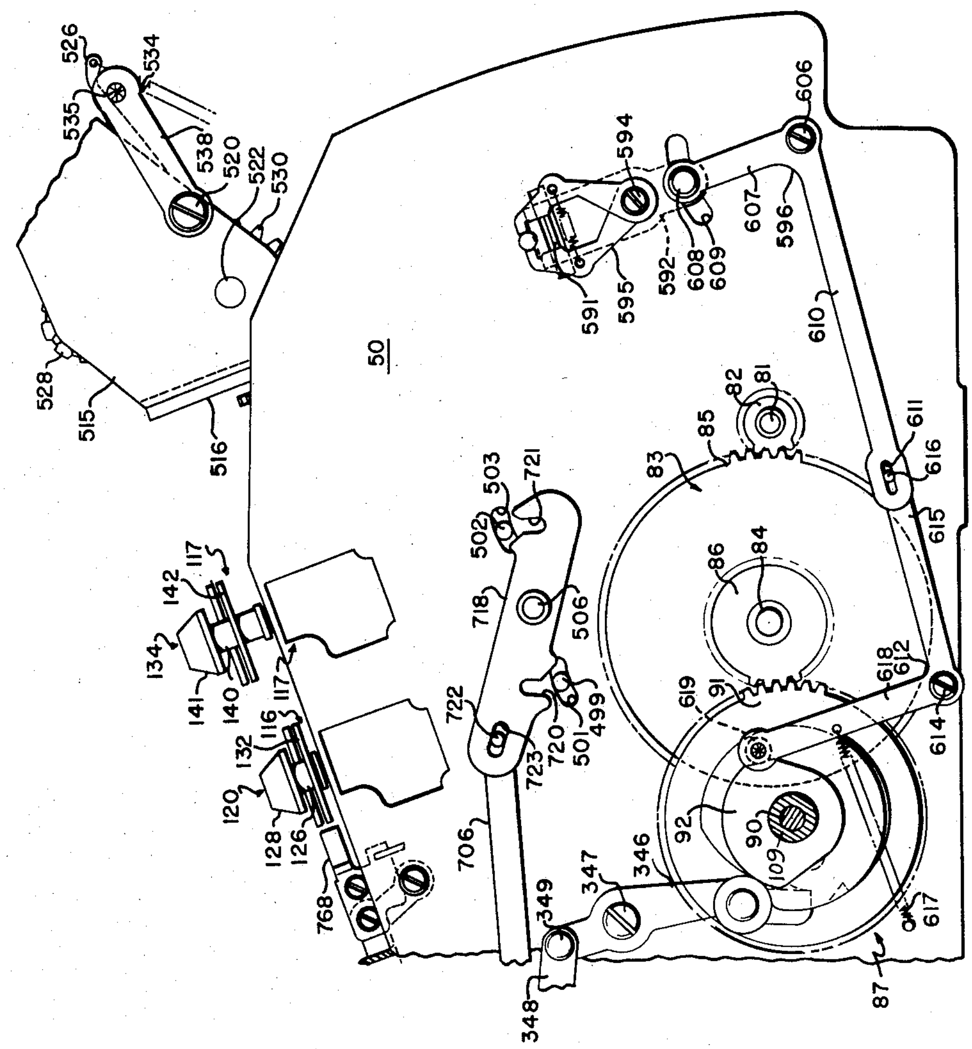
Figure 7:
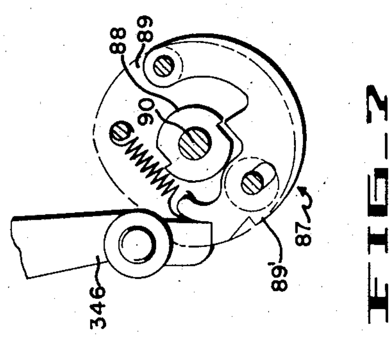
Figure 9:
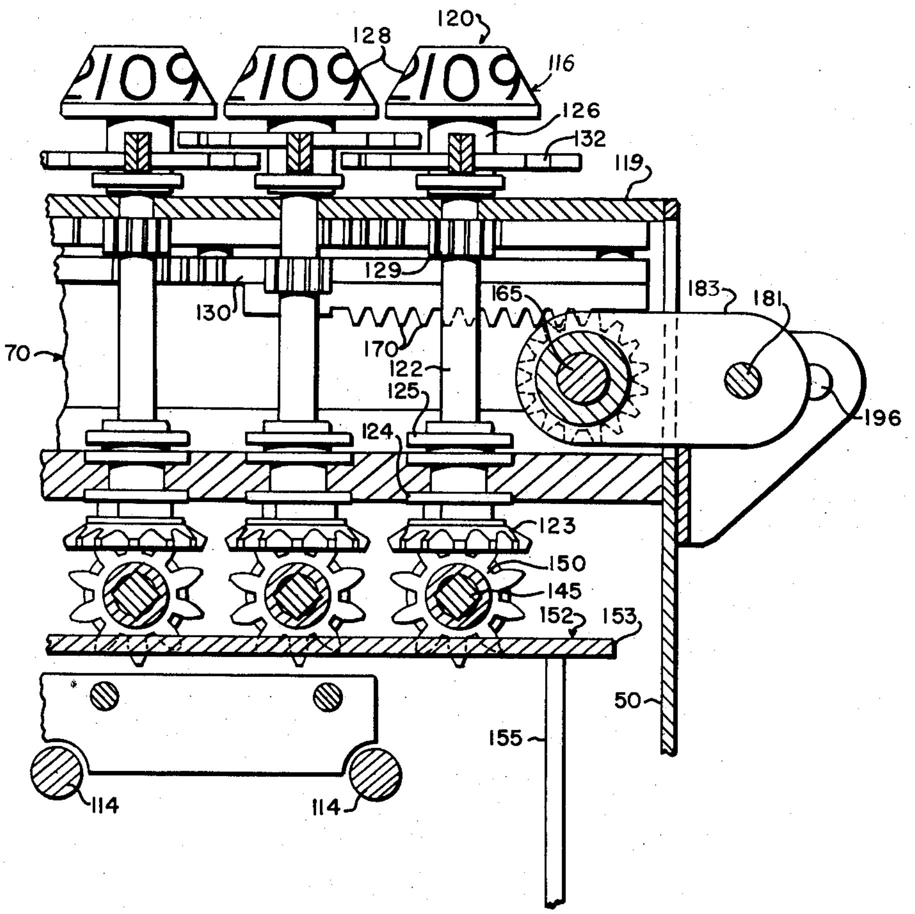
Figure 10:
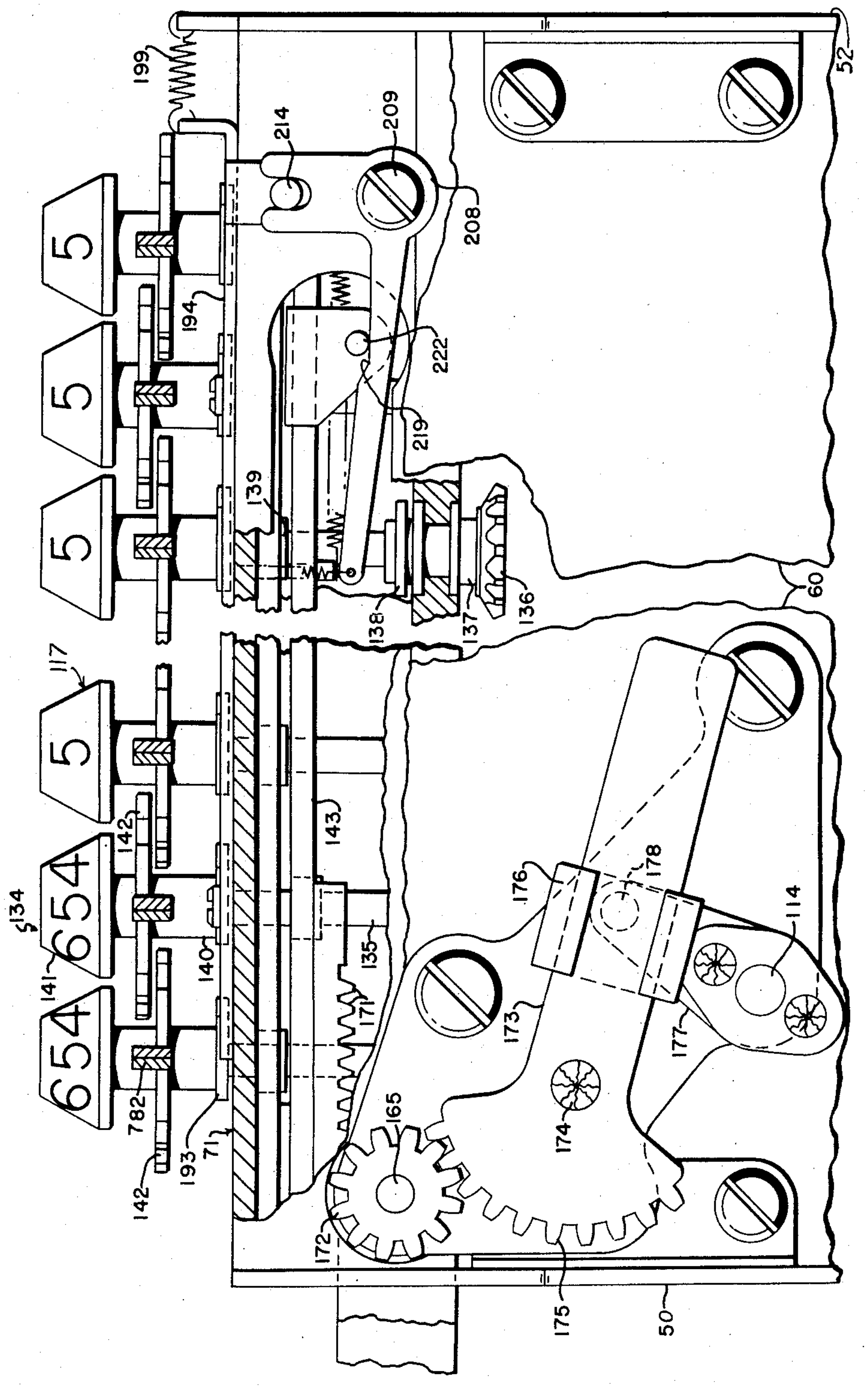
Figure 11:
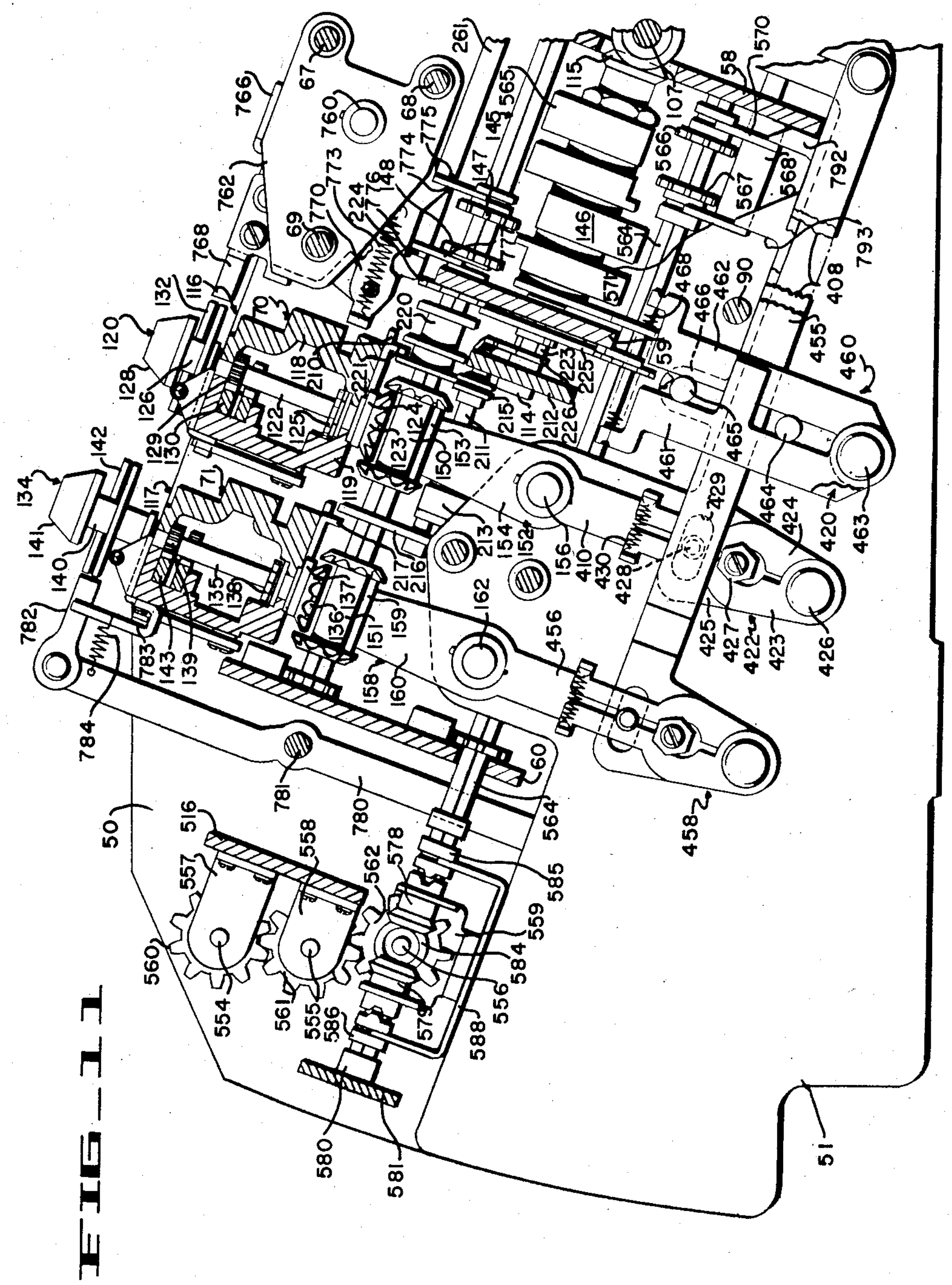
Figure 11A:
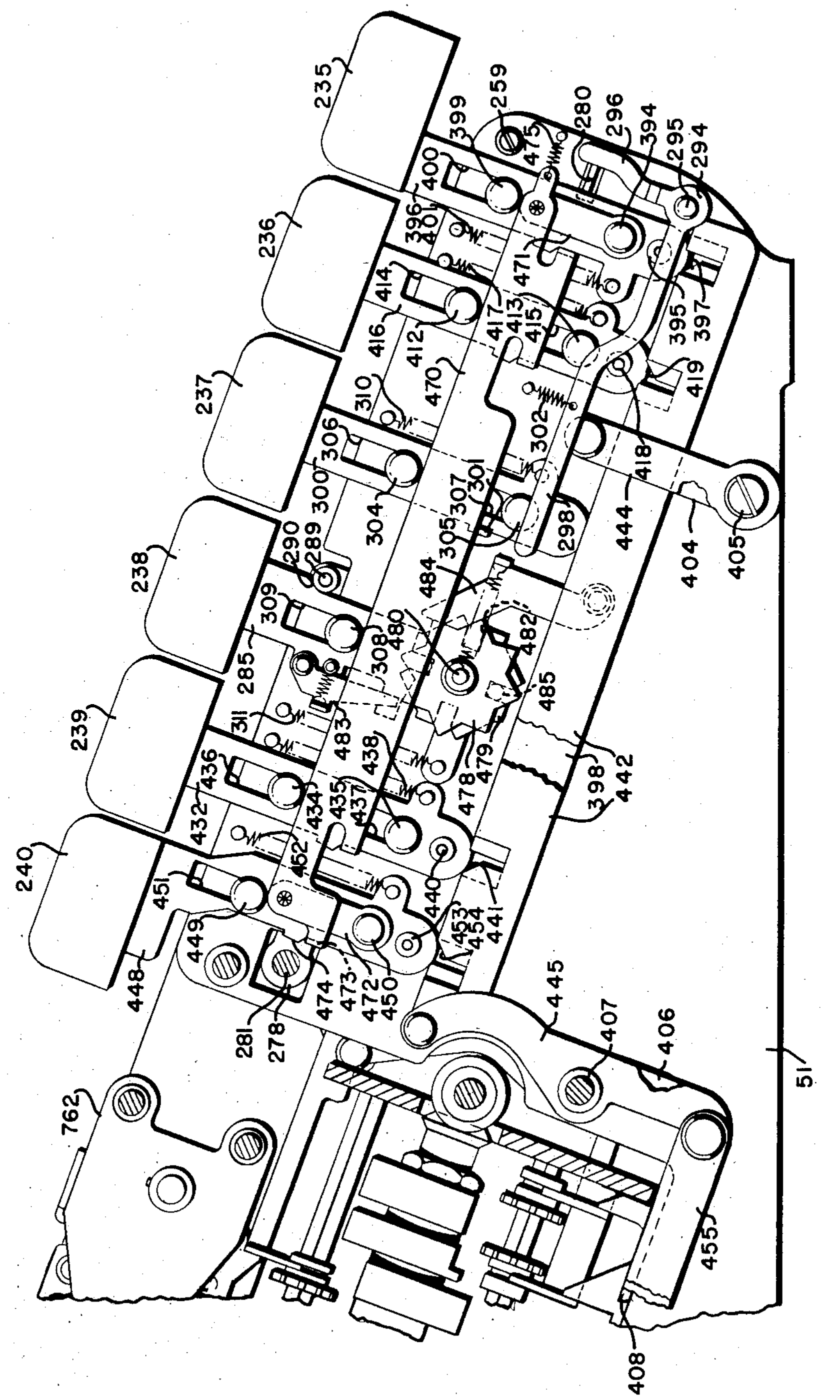
Figures 12, 19:
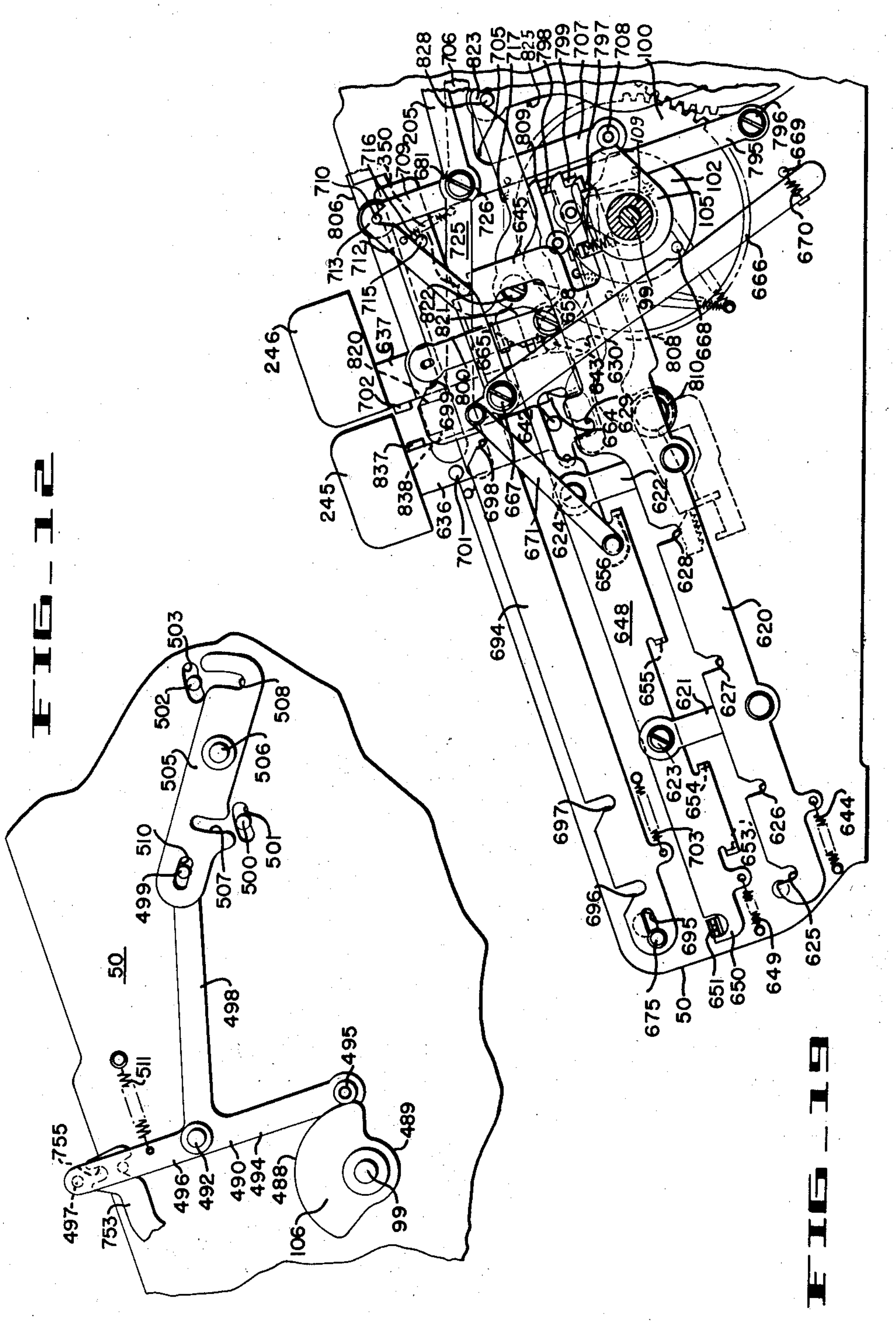
Figure 13:
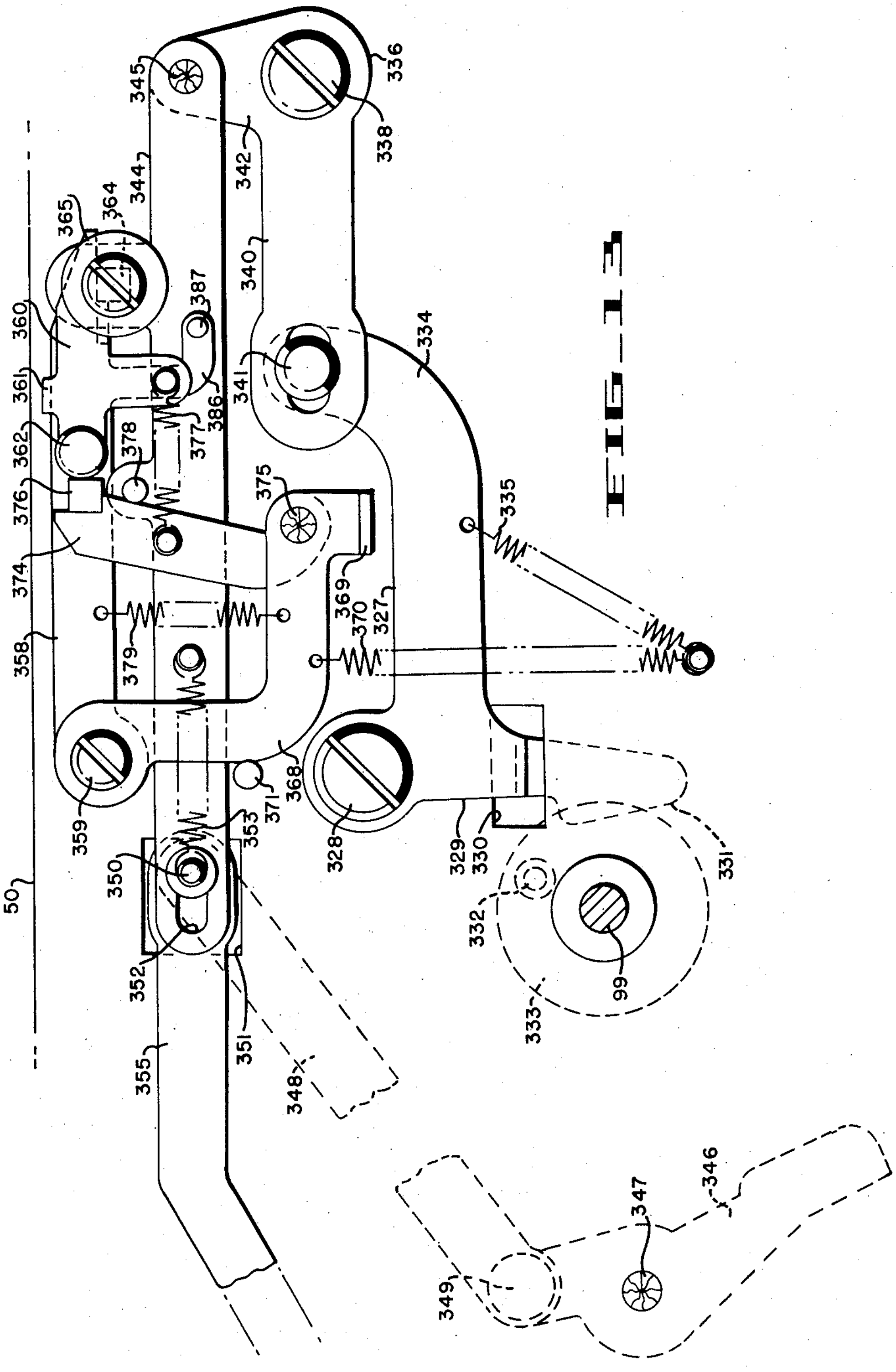
Figures 14, 15:
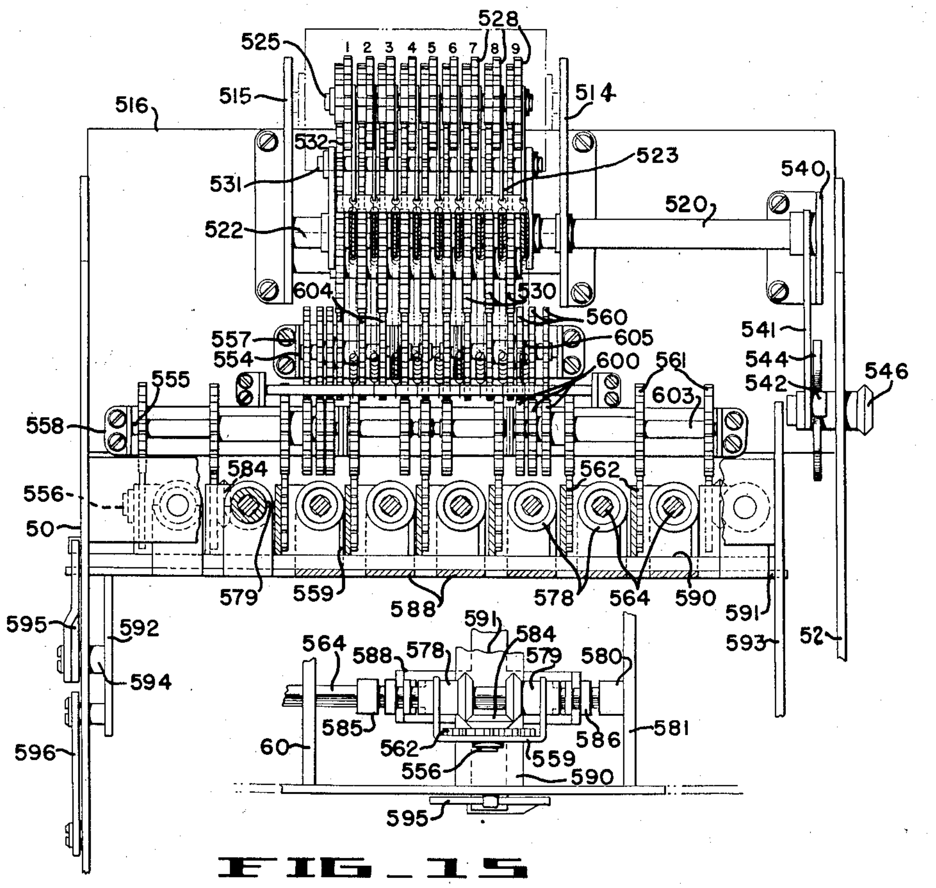
Figures 2A, 16:
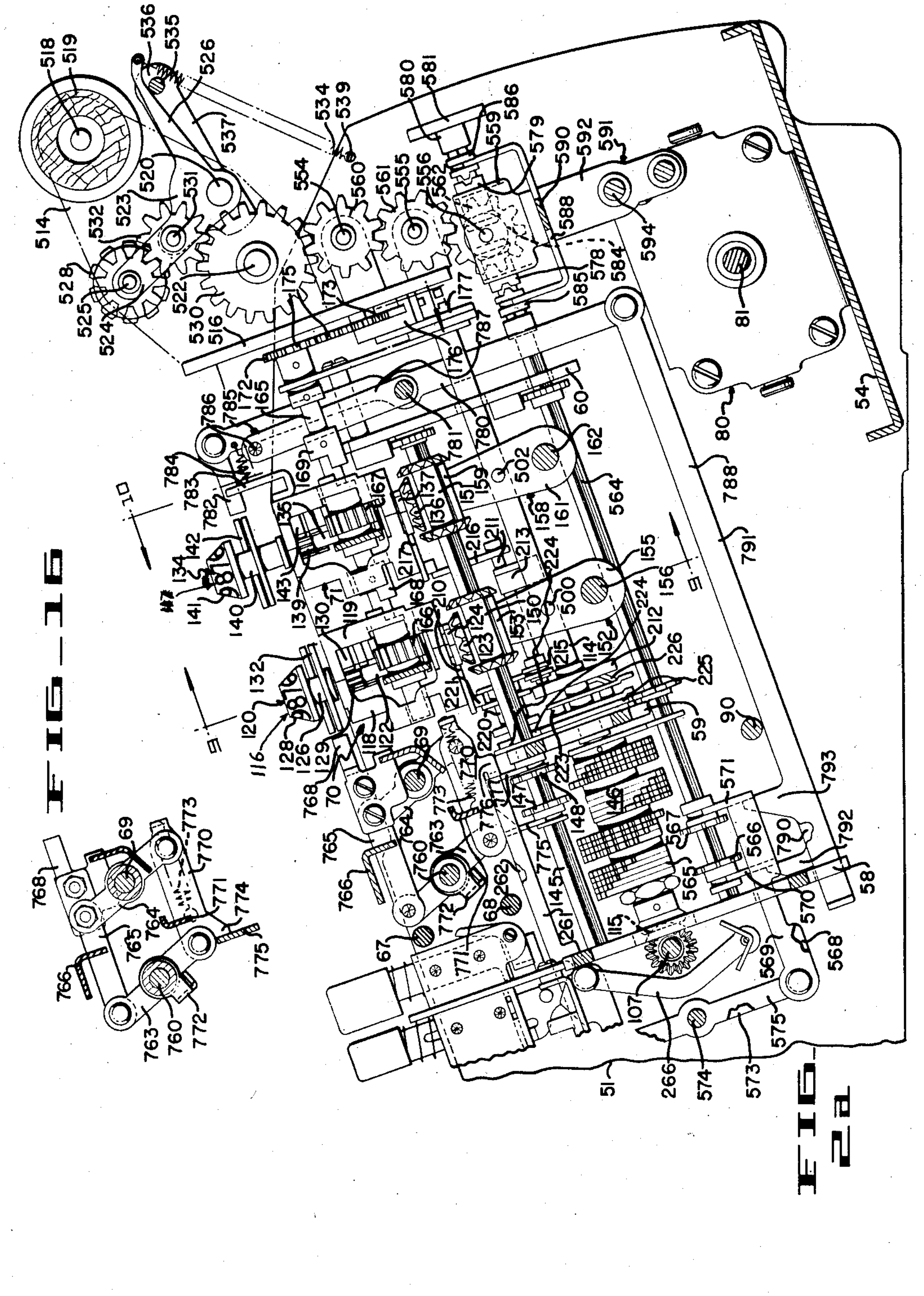
Figures 18, 20:
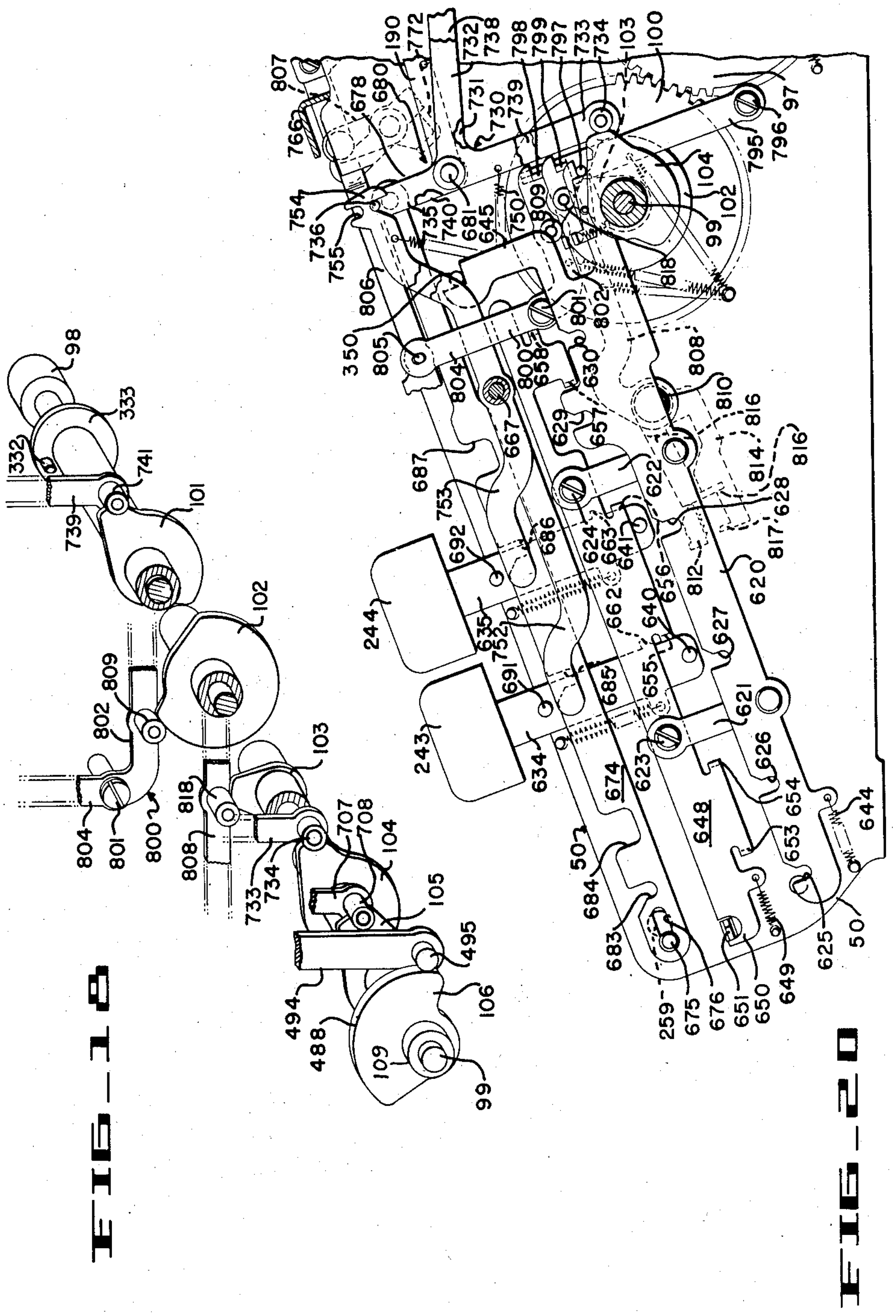
Figure 19A:
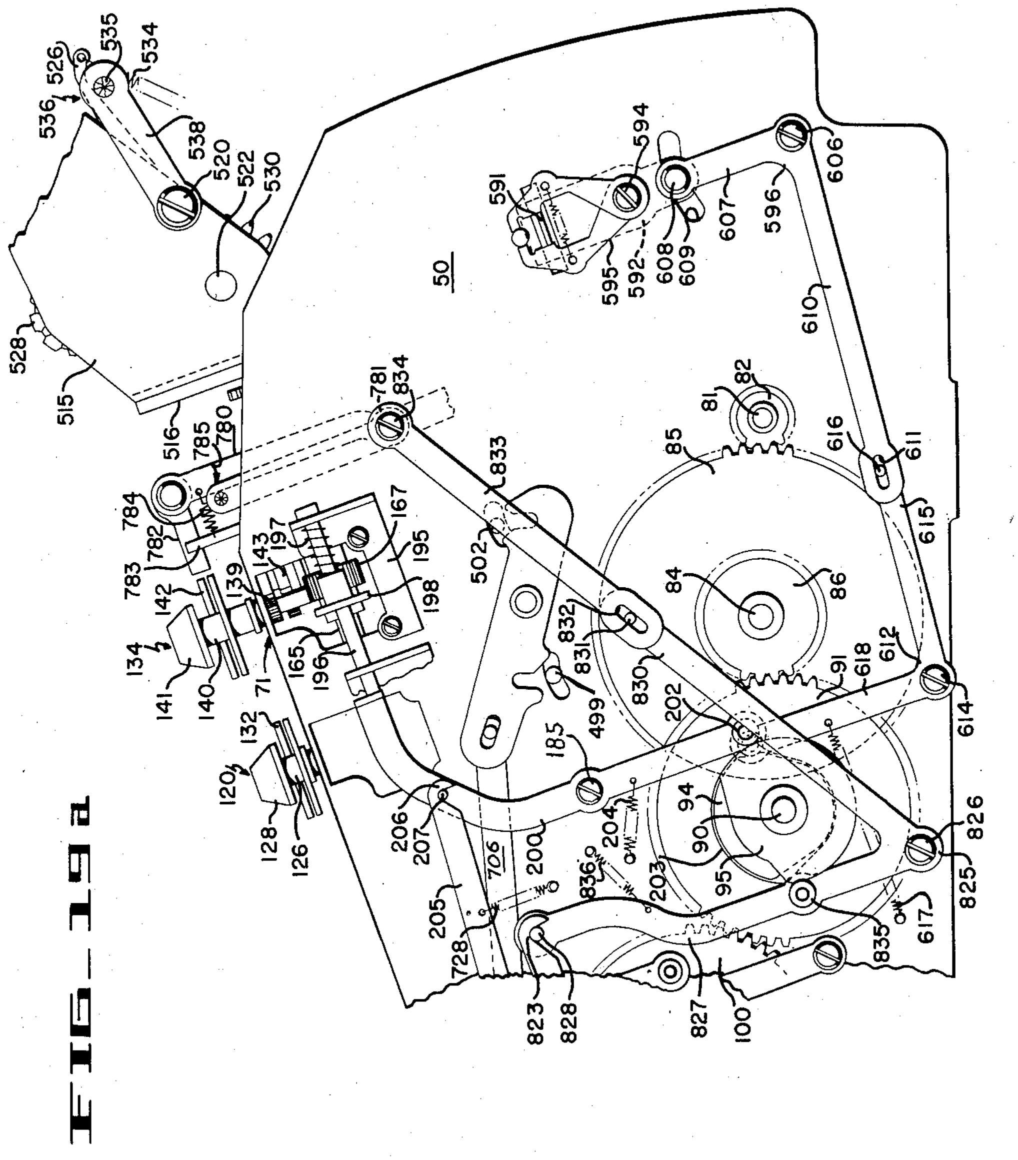
Figure 20A:
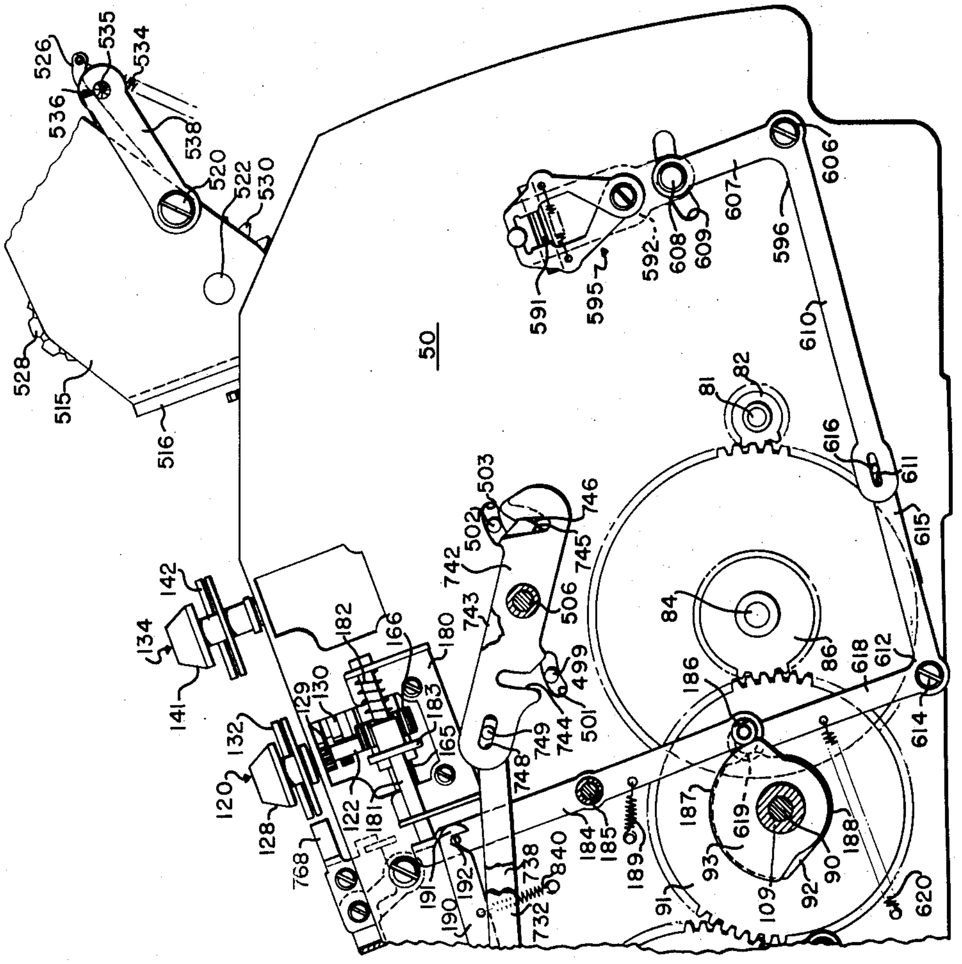

Figs. 6 and 6*a* together constitute a side elevational view of the right-hand side of the machine with the cover removed, some of the control parts being omitted for the purpose of simplifying the drawings and the drive shafts being shown in transverse cross-section;

Fig. 7 is a fragmentary cross-sectional view of the clutch taken on the plane indicated by the line 7—7 of Fig. 4;

Fig. 8 is a diagrammatic perspective view of the automatic keyboard clearing mechanism of the machine;

Fig. 9 is a fragmentary transverse cross-sectional view, on an enlarged scale, of the register driving and clearing mechanism taken along the plane indicated by the line 9—9 of Fig. 2*a*;

Fig. 10 is a transverse cross-sectional view, on an enlarged scale, of the rear side of the register and its clearing mechanism, such as taken along the plane indicated by the lines 10—10 of Fig. 2*a*, with parts omitted for the purpose of simplifying the drawing;

Figs. 11 and 11*a* together constitute a side elevational view on an enlarged scale of the left-hand side of the machine with the cover removed and with parts broken away and shown in cross-section;

Fig. 12 is a fragmentary side elevational view of the right-hand side of the machine showing one of the gate positioning levers;

Fig. 13 is an elevational view on an enlarged scale of the live key operated, cycle establishing mechanism disposed at the right-hand side of the machine;

Fig. 14 is a rear elevational view of the machine with parts broken away and shown in cross-section to better illustrate the construction of the printing mechanism;

Fig. 15 is a top plan view of a fragmentary portion of the mechanism shown in Fig. 14;

Fig. 16 is a fragmentary cross-sectional view on a plane parallel to, but spaced to the left from, the section plane of Fig. 2*a*, and shows mechanism for sensing values from "1" to "5" standing in the front register of the machine;

Figs. 17*a* to 17*j* show in top plan view a front register sensing cam and associated sensing fingers, with the cam shown in different angular positions corresponding to digit readings from "0" to "9" on the associated register dial;

Fig. 18 is a fragmentary perspective view of the main cam shaft of the machine and the cams carried thereby;

Figs. 19 and 19*a* together constitute an elevational view of the right-hand side of the machine with the cover removed and showing certain control elements omitted from Figs. 6 and 6*a*, with parts omitted for the sake of simplicity of the drawings; and Figs. 20 and 20*a* constitute a side elevational view of the right-hand side of the machine with the cover removed and showing certain control elements omitted from Figs. 6 and 6*a*, or 19 and 19*a*, with parts omitted for the sake of simplicity of the drawings.

The adding machine of the present invention has two separate accumulator registers and common control, selection, and digitation, or actuator, mechanisms, whereby entry values can be selectively entered, additively or subtractively, into either register. This arrangement provides a high degree of flexibility in the use of the machine since, for example, debits can be accumulated in one register and credits in the other register and total credits and total debits indicated at the same time. Also, entries or subtotals can be indicated in one register and grand totals in the other register, and accumulated values in one register can be automatically transferred, either additively or subtractively, to the alternative register to provide a balance between values carried in the two registers. This machine also has a full keyboard in which an upper and a lower horizontal row of motor keys and a right-hand ordinal or longitudinal row of number keys are preferably provided as live keys, each of which is effective to establish an operating cycle of the machine when depressed, so that it is not necessary to operate a control key for each entry of a value into the registers. The machine has, preferably at the left-hand side of the keyboard, a set of manually settable conditioning keys by means of which the register into which the values are to be entered is selected and the additive or subtractive nature of the entry is also selected. A row of control keys is provided, preferably at the right-hand side of the keyboard which can be manually operated to establish total and subtotal taking and transfer operating cycles of the machine.

In the particular form shown to exemplify the invention, the machine also includes manually controlled mechanism by means of which a value standing in a register of the machine can be automatically set back into the selection mechanism and locked therein subject to manual release, and has means whereby all of the digits of an entry value, except the last i.e., the live key digit, can be locked in the keyboard and repeatedly added or substracted by depressing only the last digit key, this digit being varied from entry to entry, if desired.

Figure 2:
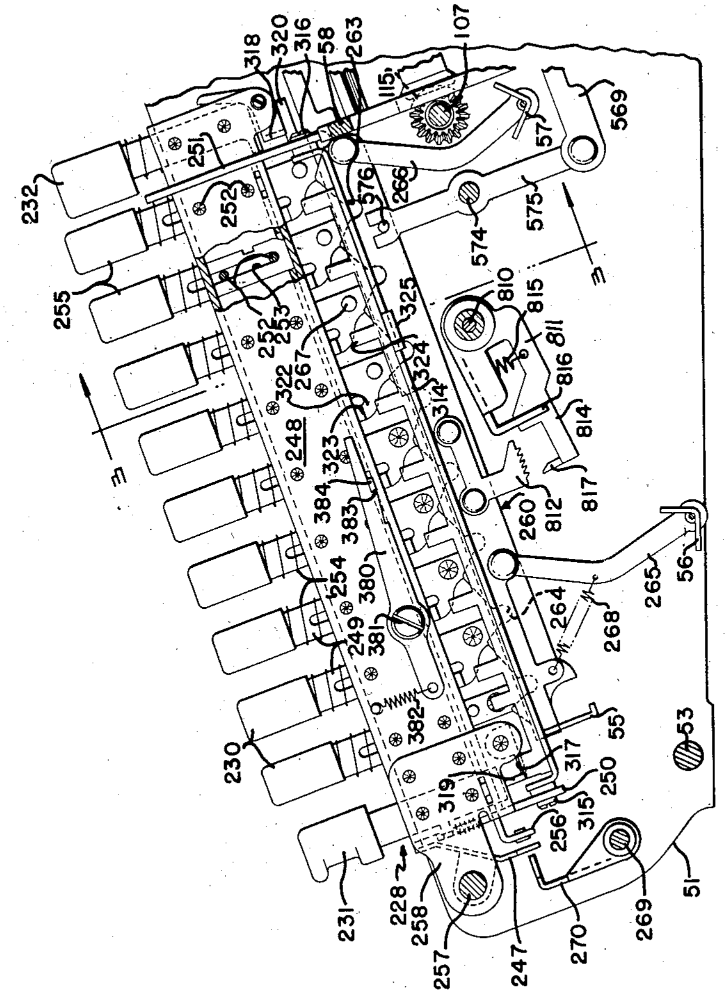

With continued reference to the drawings, the machine embodies the following parts and mechanism cooperating in the manner indicated to accomplish the above-mentioned results:

I. *Frame and cover* (*Figs. 2, 2a and 4*)

The mechanism of the machine is supported on a frame comprising a pair of spaced apart and substantially parallel side plates 50 and 51, and an auxiliary frame plate 52 spaced from, and substantially parallel to, the outer side of the left-hand side plate 51. The main side plates 50 and 51 are normally disposed substantially vertically with their straight bottom edges in a common horizontal plane and their upper edges rearwardly and upwardly inclined. The frame plates 50 and 51 are held in spaced and parallel relationship to each other by suitable cross-members including a tie rod, 53, Fig. 2, near the front end of the machine, a motor supporting plate 54, Fig. 2*a*, near the lower rear edge of the machine, element supporting combs 55, 56 and 57, Fig. 2, spaced apart longitudinally of the keyboard portion of the machine, and transverse plates 58, 59 and 60, Figs. 2*a* and 11, spaced apart longitudinally of the register portion of the machine and disposed perpendicular to the side plates 50 and 51, and also substantially perpendicular to the inclined top edges of these side plates.

Figure 5:
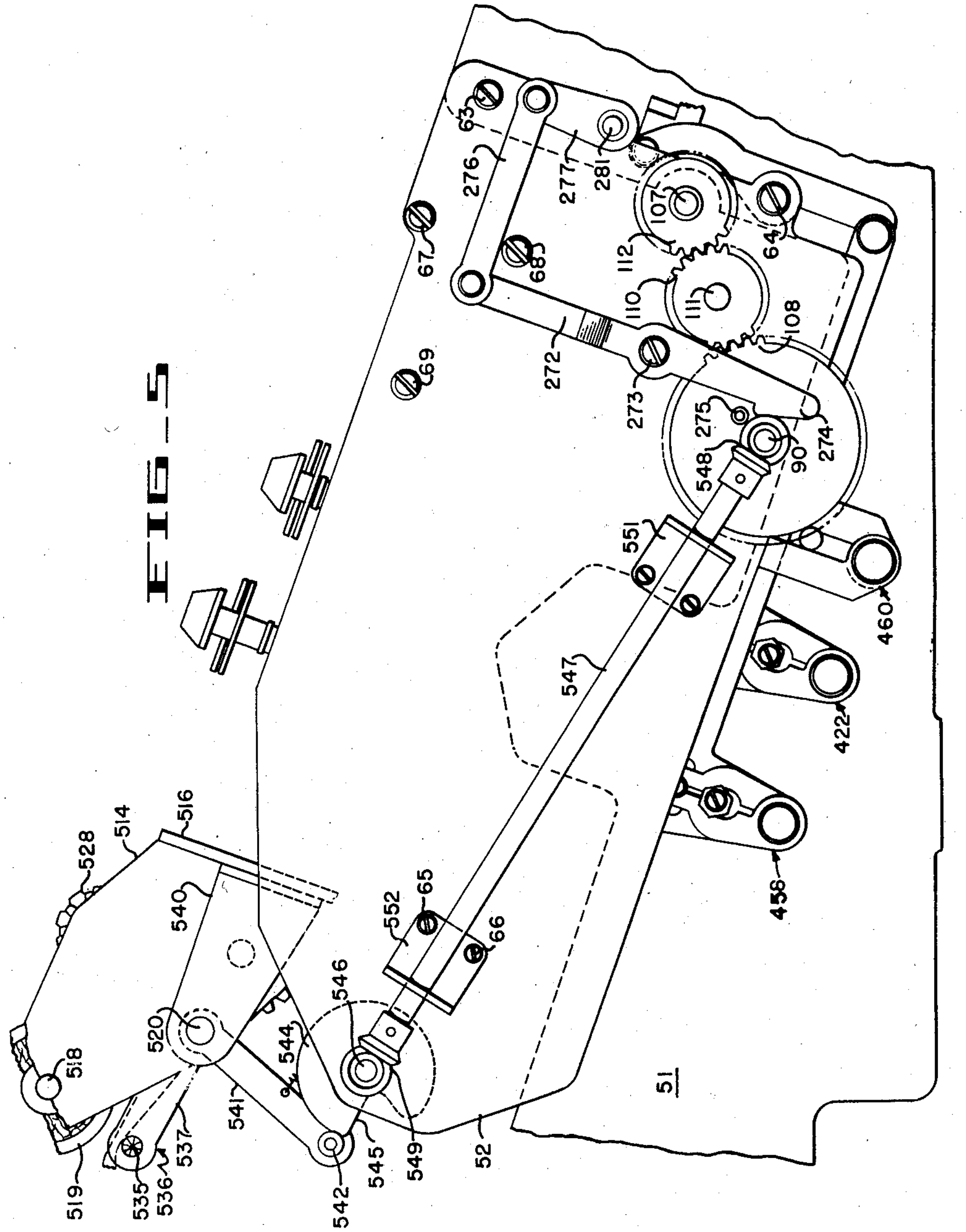
Fig. 5 is an elevational view of the rear portion of the left-hand side of the machine with the cover removed.

As shown in Fig. 5, the auxiliary frame plate 52 is supported on the left-hand side plate 51 by suitable spacer screws 63, 64, 65 and 66 and from the right-hand side plate 50 by the tie rods 67, 68 and 69.

The register frames, as generally indicated at 70 and 71 in Fig. 2*a*, also extend across the upper rear portion of the space between the right-hand side plate 50 and the auxiliary frame plate 52 in spaced and parallel relationship to each other and are secured at their ends to the indicated frame plates to hold the frame plates 50 and 52 in spaced and parallel relationship to each other.

The above construction provides a strong and rigid frame on which all of the mechanism of the machine is mounted, there being no need for a machine base. If desired, however, a bottom cover or pan may be detachably secured between the lower edges of the side plates 50 and 51 to provide sound dampening and retain any oil or dirt that may drop from, or be thrown off of, the mechanism.

Figure 1:
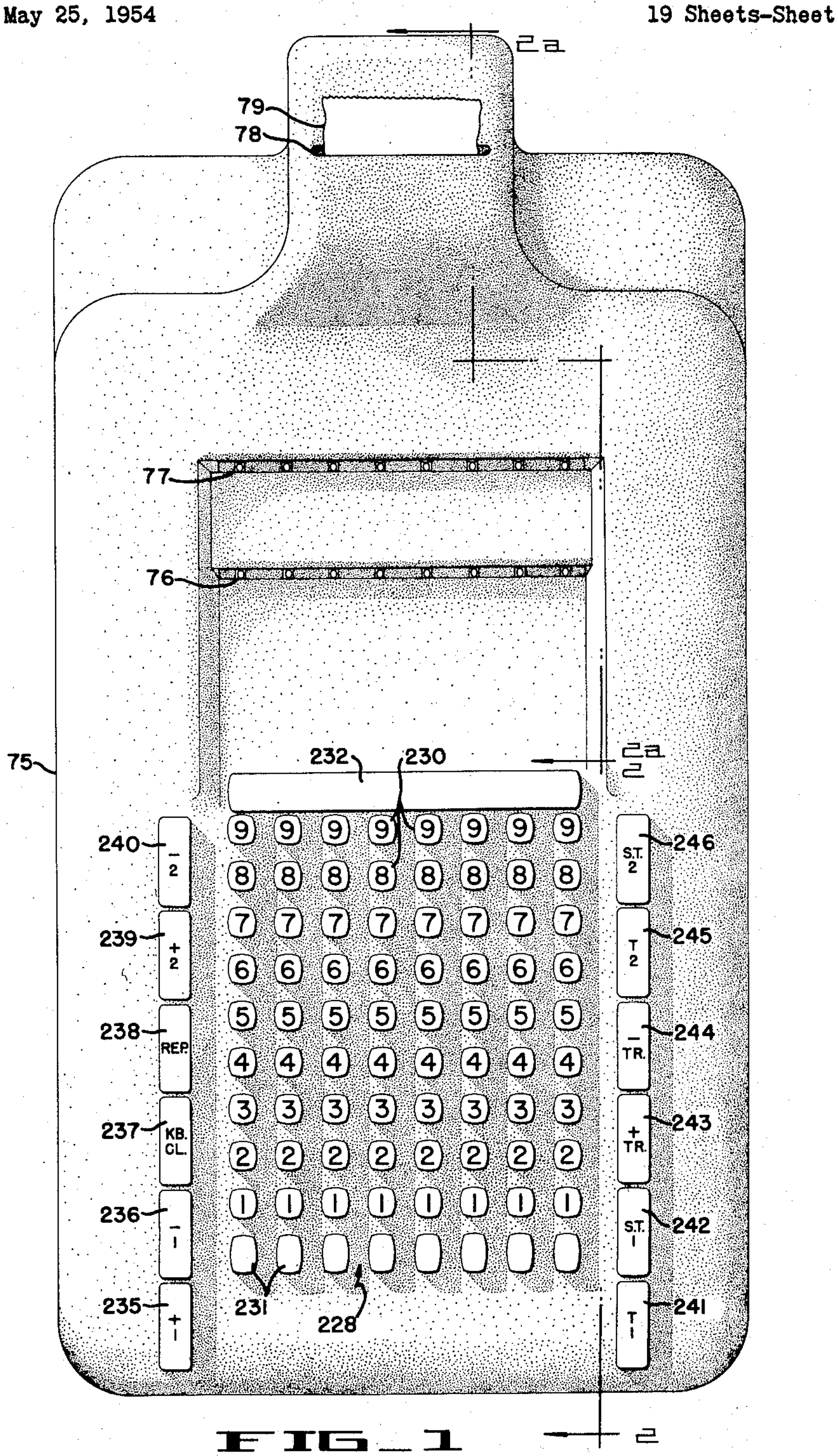

As shown in Fig. 1, the machine cover 75 is a thin walled, pan-shaped structure having an open bottom and receiving the entire machine therein. The side walls of the cover are spaced from the outer sides of the frame side plates, 50 and 51, to provide space for mechanism outside these frame plates. The top wall of the cover is provided with spaced-apart openings for the keyboard, conditioning key and control key stems, with sight openings 76 and 77 for the machine registers and with a slot 78 for the emergence of the paper printing tape 79 from the interior of the cover.

II *Mainpower mechanism* (*Figs. 2a, 4, 6a and 7*)

As shown in Figs. 2*a*, 4, 6*a*, and 7, an electric motor 80 is mounted on the rear frame cross-member 54 and has a shaft 81 extending through an aperture in the right-hand frame plate 50 and carrying a spur gear 82 at the outer side of the plate 50. A journal pin 84 is secured at one end to plate 50 at a location spaced from motor shaft 81 and projects perpendicularly from the outer side of plate 50. A compound gear 83 is journalled on the pin 84 and includes a spur gear 85, larger than the gear 82, meshing with the gear 82, and a gear 86, smaller than the gear 85, and coaxial therewith.

A shaft 90 extends through the frame plates 50 and 51 and the space between these frame plates, and is journalled near its ends in suitable bearings mounted on the frame plates. A gear 91 larger than the gear 86 is journalled on shaft 90 at the outer side of the right-hand frame plate 50 and meshes with the gear 86. A single cycle, or one-rotation, clutch, generally indicated at 87, and of well-known construction, is mounted on shaft 90 for periodically connecting the gear 91 to this shaft. This clutch has a ratchet element 88, Fig. 7, journalled on the shaft 90 and secured to gear 91 and a second element mounted on, and drivingly connected to, the shaft 90 and including a disk 89 mounted on the shaft and a clutch pawl 89' pivotally mounted at one end on the disk 89 and spring-urged into engagement with the ratchet element 88 to drivingly connect the gear 91 to the shaft 90, this driving of the shaft by the gear being controlled by mechanism to be later described in detail.

Cams 92, 93, 94, and 95, as shown in Fig. 4, the purpose of which will be later explained, are mounted on shaft 90 at the outer side of gear 91 at locations spaced apart longitudinally of the shaft. A spur gear 97 is mounted on shaft 90 at the inner side of frame plate 50.

As further shown in Fig. 4, a stub, or jack, shaft 99 is journalled in a bearing bushing, not shown, in plate 50, forwardly of, and parallel to, shaft 90, and projects perpendicularly outwardly from plate 50. Inwardly of the plate 50 the stub shaft 99 is provided with a terminal socket formation 98. A gear 100 of the same size as the gear 97 is mounted on stub shaft 99 at this inner side of plate 50 and meshes with gear 97 so that stub shaft 99 is driven at the same speed as shaft 90 whenever shaft 90 is driven, the gear ratio from motor shaft 81 to shaft 90 being such, in the embodiment illustrated, that shaft 90 and stub shaft 99 are both driven substantially at 250 revolutions per minute. Cams 101, 102, 103, 104, 105 and 106, the purpose of which will be later explained, are mounted on stub shaft 99 by a sleeve 109 at the outer side of plate 50 and at locations spaced apart along the stub shaft (see also Fig .18).

A drive shaft 107, Fig. 4, is journalled at one end in the terminal socket formation 98 on the inner end of stub shaft 99 and extends to the left through aligned apertures in the frame plates 51 and 52, being journalled in suitable bearings mounted on these plates. A gear 108 is mounted on shaft 90 at the outer side of the auxiliary frame plate 52, meshing with a reversing gear 110 journalled on a pin 111 secured to plate 52. A gear 112 is mounted on shaft 107 and meshes with reversing gear 110, so that shaft 90 drives shaft 107 through gears 108, 110 and 112. Gears 110 and 112 have the same number of teeth, but gear 108 has twice as many teeth as gears 110 and 112, so that shaft 107 is driven in the same direction as shaft 90 but at double the speed of this shaft or 500 revolutions per minute. The shaft 107 will then complete two rotations for each cycle of the clutch 87, and each rotation of shaft 90 and stub shaft 99.

As shown in Figs. 2*a*, 4, and 9, a plurality of shafts 114 extend longitudinally of the rear portion of the machine in substantially parallel and uniformly spaced relationship to each other and are journalled at their front ends in bearing apertures in the cross plate 58 and at their rear ends in bearing apertures in the cross plate 59. The rear end (toward the right in Fig. 2*a*) of the right-hand of these shafts is extended rearwardly through the cross plate 60, as shown in Fig. 10, to provide a power drive for the register clearing mechanism of the machine, as will be later described. Beveled gear drives 115 are provided between the power, or drive, shaft 107 and each of the actuator shafts 114, so that the shafts 114 will be simultaneously driven in the same direction and at the same speed as the drive shaft 107, whenever the drive shaft is driven.

III. *Registers* (*Figs. 10 and 11*)

The machine preferably has two registers, as generally identified at 116 and 117 in Fig. 2*a*, which extend transversely of the machine in spaced-apart and parallel relationship to each other immediately under the top wall of the machine cover 75. In the accompanying drawings both registers are shown in the rear portion of the machine, but it is to be understood that the invention is not limited to any particular loction of either register longitudinally of the machine.

The front register 116 has the register frame 70 comprising a pair of somewhat channel-shaped members 118 and 119 disposed in registry with each other, with their open sides mutually opposed to provide an elongated hollow frame of roughly rectangular cross-sectional shape. A plurality of dial assemblies, as generally indicated at 120, and as best shown in Figs. 2*a* and 9, are carried by the frame 70 in ordinal arrangement. Each of these dial assemblies is mounted on a dial shaft 122 extending through the frame 70 from the top to the bottom surface of the frame and journalled in the frame medially of the width thereof. A beveled gear 123 is mounted on the lower end of dial shaft 122, and a tens-transfer cam 124 is mounted on the shaft between the gear 123 and the bottom surface of the frame 70 and has a lever operating point disposed radially of the shaft 122. A detenting wheel 125 (Fig. 9) is mounted on shaft 122 in the lower portion of the interior of frame 70 and cooperates with a frame carried spring detent in a manner known to the art, to accurately locate the shaft 122 at different predetermined angular positions. A sleeve 126 is mounted on shaft 122 immediately above the frame 70 and carries on its uper end a numbered dial 128 of truncated conical shape, the numbers on which are visible through the sight opening 76 in the machine cover as they are brought to a predetermined angular position by rotation of the dial shaft and dial. A mutilated resetting gear 129 is mounted on shaft 122 within the upper portion of the interior of the hollow frame 70, the gears on alternate shafts being staggered vertically, or longitudinally of, the shafts. A double resetting rack 130 is mounted in a groove extending longitudinally of the interior of rear member 119 of frame 70 and engages the resetting gears 129 to reset the several dial assemblies to their "0" positions when the rack is moved longitudinally relative to the register frame.

A back-transfer cam 132, shown in detail in Figs. 17*a* to 17*j*, inclusive, and hereinafter more fully described, is mounted on each sleeve 126 above the upper surface of frame 70, these back-transfer cams cooperating with other mechanism to transfer values standing in the register 116 back into the selection mechanism of the machine for transfer to the alternative register or for other purposes.

As best shown in Figs. 2*a*, 10 and 11, the rear register 117 has the register frame 71, similar in all respects to the above-described front register frame 70, which rotatably supports the dial assemblies, generally indicated at 134, ordinally arranged along the frame 71. Each of the dial assemblies 134 comprises a dial shaft 135 extending through the register frame 71 from top to bottom and medially of the width of the frame and journalled in the frame, a beveled gear 136 mounted on the lower end of the shaft, a tens-transfer cam 137 mounted on the shaft 135 between the gear 136 and the bottom surface of the frame 71, a detenting wheel 138 mounted on the shaft within the lower portion of frame 71, a resetting gear 139 mounted on the shaft within the upper portion of frame 71, a sleeve 140 mounted on the shaft above the top surface of frame 71, a numbered dial 141 of truncated conical shape mounted on the upper end of sleeve 140, and a back-transfer cam 142 mounted on sleeve 140 below dial 141. A resetting rack 143 is slidably mounted in a groove disposed internally of frame 71 and extending longitudinally thereof, and this rack, upon longitudinal movement thereof relative to the supporting frame 71, engages the resetting gears 139 of the several dial assemblies 134 and resets the dial assemblies to the "0" position of the dials.

IV. *Register drive mechanism* (*Figs. 2a, 4, 9 and 11*)

A plurality of square shafts 145 extend longitudinally of the machine above the power-driven actuator shafts 114 and are arranged in parallel and ordinally spaced-apart relationship to each other, one square shaft extending below each dial shaft 122 of the front register 116 and below the corresponding dial shaft 135 of the rear, or back, register 117. There are normally half as many actuator shafts 114 as there are square shafts 145, unless the registers are extended to the left to provide additional tens-carry dials, each actuator shaft 114 being disposed below, and between, two adjacent square shafts and parallel thereto, so that two square shafts are driven from each actuator shaft. An actuating drum 146 is mounted on each actuating shaft 114, each actuating drum including nine gear sectors divided into spaced-apart front and rear groups of five and four sectors, respectively. The gear teeth of the sectors of the front group increase progressively from one to five gear teeth from the rear to the front end of this group and the gear teeth of the sectors in the rear group increase progressively from six to nine gear teeth from the rear to the front end of this group.

A pair of selecting gears 147 and 148 are slidably mounted on, and drivingly engaged with, each square shaft, these gears being independently movable longitudinally of the corresponding square shafts by the selection mechanism of the machine to mesh with selected gear sectors of the corresponding actuator drums. It will be noted that the front selection gears 147 cooperate with the gear sectors of the front group, and the rear selection gears 148 with the gear sectors of the rear group of the corresponding actuator drums 146, so that the square shafts will be turned through angular intervals corresponding to the digits "1" to "9" by the selective positioning of the selection gears when the actuating shafts 114 are rotated incident to an operating cycle of the machine, as described above.

This is a form of the well-known Thomas-type actuating mechanism for calculating machines, examples of which are disclosed in Carl M. Friden patents Nos. 2,229,889 of January 28, 1941, 2,371,752 of March 20, 1945 and 2,388,209 of October 30, 1945, and may be referred to hereinafter as Thomas-type actuating mechanism.

Two spool gear members 150 and 151 are slidably mounted on each square shaft 145 in positions such that the gear member 150 is disposed immediately below the beveled gear 123 of the corresponding dial assembly 120 of the front register 116, and the gear member 151 is disposed immediately below the beveled gear 136 of the corresponding dial assembly 134 of the rear register 117.

Each of the gear members 150 and 151 comprises a pair of beveled gear elements spaced apart on the corresponding spools a distance somewhat greater than the diameter of the dial assembly beveled gears 123 and 136 the gear elements being joined by a sleeve through which the square shaft extends. The gear members 150 and 151 are slidable along the corresponding square shafts 145 but are drivenly connected thereto, and are so mounted on the shaft that the two gears, or gear elements, of each member 150 are disposed, respectively, at the front and rear sides of the corresponding beveled gear 123 of the front register, while the two gears of each gear member 151 are disposel, respectively, at the front and rear sides of the corresponding beveled gear 136 of the rear register.

As is well known, when the gear of a gear member 150 or 151 at the front side of a beveled gear 123 or 136 is in mesh with the cerresponding beveled gear, the associated dial assembly will be rotated in one direction; and, when the gear of a gear member at the rear side of a beveled gear is in mesh with the corresponding beveled gear, the associated dial assembly will be turned in the opposite direction, the rotation of the actuator shafts 114 and square shafts 145 being unidirectional. This enables the register drive mechanism to enter values either additively or subtractively into the registers.

The meshing of the gears of the gear members 150 with the beveled gears 123 is controlled by a bail, generally indicated at 152, comprising a flat crossbar, or strap, 153 extending between the front and rear gears of the gear members 150 below the sleeve portions of these gear members, and legs 154 and 155, Figs. 11 and 2*a*, extending downwardly, one from each end of the crossbar 153 and secured at their lower ends to rockable shaft 156 extending transversely of the lower portion of the machine and journalled in the frame side plates 50 and 51.

The meshing of the gears of gear members 151 with the beveled gears 136 of the rear register is controlled by a bail, generally indicated at 158, comprising a crossbar, or strap, 159 extending between the gears and below the sleeve portions of the rear gear members, and legs 160 and 161, extending one from each end of the crossbar 159 and secured at their lower ends to a rockable shaft 162 which extends transversely of the lower portion of the machine and is journalled in the frame side plates 50 and 51.

The bails 152 and 158 are positioned by the conditioning and control keys of the machine and are also operated by the mechanism of the machine in a manner to be later described.

V. *Register clearing mechanism* (*Figs. 2a, 9, 10, 19a and 20a*)

The register clearing mechanism, in addition to the clearing racks 130 and 143 and the rearwardly extended, right-hand actuator shaft 114, comprises a shaft 165, Fig. 2*a*, extending longitudinally of the machine at the right-hand side thereof and through the register frames 70 and 71 in which it is journalled; pinions 166 and 167 loosely mounted on shaft 165 and engaging rack teeth 170 and 171 on the clearing racks 130 and 143, respectively; and collars 168 and 169 mounted on the shaft 165 in spaced relationship to the hubs of the gears 166 and 167, respectively. The hubs of the gears 166 and 167 have their ends opposed to the corresponding collars angularly recessed and the collars have their ends opposed to the adjacent gear hubs correspondingly recessed as shown in Fig. 2*a*, so that when the gear 166 or the gear 167 is shifted rearwardly into engagement with the corresponding collar 168 or 169, the collar drivingly connects the gear to shaft 165.

Shaft 165 is driven from elongated shaft 114 at the right-hand side of the machine by mechanism particularly illustrated in Fig. 10, and comprising a gear 172 mounted on the rear end of shaft 165 at the rear side of rear cross plate 60, a lever 173 disposed at the rear side of cross plate 60 and pivotally mounted thereon at 174 and terminating at one end in a sector gear 175, meshing with gear 172. Lever 173 is rocked about its pivotal mounting 174 by a slide block 176 slidably mounted on lever 173 at the side of pivotal connection 174 remote from sector gear 172, and an arm 177 mounted on the rear end of elongated actuator shaft 114 and having a pivotal connection 178 with the slide block 176 spaced from the shaft 114.

With this arrangement, when the right-hand actuator shaft 114 is rotated, lever 173 will be oscillated from its full-cycle position through a predetermined angular interval and back to its full-cycle position, the movement away from the full-cycle position requiring a longer time interval than the return movement. This oscillating movement of lever 173 rotates shaft 165, first in one direction away from its full-cycle position and then in the opposite direction back to its full-cycle position.

As shown in Fig. 20*a*, a bracket 180 is mounted at the outer side of right-hand side plate 50 opposite the right-hand end of front register frame 70. A plunger 181 is slidably mounted in this bracket for longitudinal movement parallel to the shaft 165 and is resiliently urged to its forward limiting position by a compression spring 182. A yoke 183 is mounted at one end on, and projects perpendicularly from, the plunger 181 and has at its other end a bifurcated formation engaged in an annular groove in the hub of the gear 166, so that this gear will be moved rearwardly to engage its hub with the collar 168, as described above, when the plunger 181 is moved rearwardly against the force of spring 182.

A lever 184 is disposed at the outer side of frame plate 50 and is pivotally mounted intermediate its length on a pivot pin 185 carried by the plate 50. At its upper end lever 184 bears against the forward end of plunger 181 and at its lower end carries a cam following roller 186 riding on the peripheral edge of front register clearing cam 93. Cam 93 has a lobe portion 187 extending through approximately 170° of arc and a retracted dwell 188, i.e., one of reduced radius, extending around the remainder of the cam, the cam being so positioned on the shaft that when it is in its full-cycle position, as shown in Fig. 20*a*, the cam follower 186 is on the leading end of the cam lobe 187. The cam follower 186 is held against the cam 93 by a spring 189 connected at one end to the plate 50 and at its other end to the lever 184 below the pivot pin 185, which spring has sufficient strength to rock the lever 184 and move the plunger 181 rearwardly to engage the clutch jaws of the hub of gear 166 with the complementary jaws of collar 168. In this condition the rotation of shaft 165 and gear 166 will shift rack 130 to clear the front register 116. The rocking of lever 184 will take place at approximately the midpoint of a cycle, when the cam follower rides off the lobe 187 of cam 93 and onto the retracted dwell 188. Normally this rocking movement of lever 184 is releasably restrained, for a purpose presently to be described, by a pivoted latch 190 having at its rearward end a hook formation 191 engaging a pin 192 projecting laterally from lever 184 near the upper end of this lever.

As shown in Fig. 19*a*, a second bracket 195 is mounted at the outer side of frame plate 50, opposite the right-hand end of rear register frame 71. A plunger 196 is slidably mounted in this bracket for longitudinal movement parallel to the shaft 165. This plunger is resiliently urged to its forward limiting position by compression spring 197. A yoke 198 is secured at one end on, and projects perpendicularly from, plunger 196, having at its other end a bifurcated formation engaged in an annular groove in the hub of gear 167 to move this gear longitudinally of shaft 165 when plunger 196 is moved. When plunger 196 is moved to its rearward limiting position, the gear 167 will be moved rearwardly to engage its hub with the collar 169 for clearing the rear register 117, as described above.

A lever 200 disposed at the outer side of frame plate 50 is pivotally mounted intermediate its length on this plate by the pivot pin 185 and bears at its upper end against the forward end of plunger 196. A cam following roller 202 is mounted on the lower end of lever 200 and rides on the circumferential edge of rear register clearing cam 94. This cam has a lobe portion 203 extending through approximately 100 degrees of arc and a retracted dwell portion extending around the remainder of the cam, the cam follower 202 being disposed near the leading end of the cam lobe 203 when the cam is in its full-cycle position, as shown in Fig. 19*a*. A tension spring 204 is connected at one end to frame plate 50 and at its other end to lever 200 below pivot pin 201 and has sufficient strength to rock lever 200 and move plunger 196 rearwardly against the force of spring 197 when the cam follower 202 rides off of the lobe 203 into the low portion of cam 94. Lever 200 is, however, releasably restrained from rocking, for a purpose to be later described, by a pivoted latch arm 205 having at its rear end a hook formation 206 engaging a pin 207 projecting laterally from lever 200 near the upper end of this lever.

Zero stop mechanism is provided for each register 116 and 117 and, in the case of the rear register 117, as shown in Fig. 10, comprises stop cams 193 mounted one on each dial shaft 135 at the top surface of register frame 71, and a stop bar 194 slidably mounted on, and extending longitudinally of, the register frame past the several dial shafts. Each cam 193 is provided with a radially projecting tooth and the stop bar 194 is provided with spaced-apart abutment formations which, when the bar is in operative position, engage the corresponding cam teeth to stop the register dial assemblies in their "0" positions.

The bar is resiliently moved to inoperative position by a spring 199 connected between the left-hand end of the bar and the left-hand outboard frame plate 52, and is moved to operative position during clearing of the register by a bellcrank lever 208 pivoted at its angle on plate 60 by pivot screw 209 and having an upwardly extending arm loosely connected with bar 194 at 214 and having an arm extending to the right from screw 209. The horizontally extending arm is provided on its upper edge with a cam edge 219 engaged by a pin 222 carried by, and disposed below, the register clearing rack bar 143. The shape of cam edge 219 is such that when rack bar 143 is shifted to the right to clear the register, the lever 208 is rocked in a direction to move stop bar 194 to its operative position against the force of spring 199 to positively stop the dial assemblies at their "0" positions when they are turned to such positions during the register clearing, or zeroizing, action. As soon as the clearing operation is completed, spring 199 returns bar 194 to its inoperative position, so that the dial assemblies can be turned past their "0" positions during digitation. There is a similar zero stop mechanism, not illustrated, for the front register.

VI. *Tens-transfer mechanism* (*Figs. 2a and 11*)

A plurality of flat bellcrank levers 210 are pivotally mounted in ordinal arrangement on the bottom surface of the front register frame 70 and are rocked by the corresponding tens-transfer cams 124 when the associated dial assemblies pass through their "0" positions, as is well known to the art.

A plurality of detenting pins 211 are ordinally arranged below, and parallel to, the square shafts 145 and are slidably supported near their ends in transverse frame plates 212 and 213 for longitudinal movement. Each pin carries near its forward end a pair of spaced-apart annular flanges 215.

An arm 216 projects perpendicularly upwardly from each pin 211 near the rear ends of the pins, the upper ends of which arms are disposed in opposition to the corresponding tens-transfer levers 217 pivotally mounted on the bottom of the rear register frame 71. A tens-transfer gear 220, Fig. 2*a*, is slidably mounted on each square shaft 145 adjacent the front end of the forward gear element 150. Each of these tens-transfer gears comprises a hub slidably but nonrotatably mounted on the corresponding square shaft, a gear element at the forward end of the hub and a pair of spaced-apart annular flanges on the hub rearwardly of the gear element. Each tens-transfer lever 210 is pivotally mounted on the bottom of the front register frame 70 and has at the forward side of the register frame a depending tongue 221 engaged between the flanges of the tens-transfer gear 220 mounted on the square shaft 145 of the next order above the dial assembly carrying the tens-transfer cam 124 which rocks the particular lever 210 when the dial assembly is turned through the "0" position of the corresponding dial. One of the flanges on each tens-transfer gear is received between the two flanges 215 on the corresponding detenting pin 211, so that the transfer gear and the corresponding detenting pin are constrained to move simultaneously and coextensively. Spring detents, not illustrated, are mounted in pockets in the frame cross-member 213 and engage in annular grooves spaced apart longitudinally of the corresponding detenting pins 211 to releasably hold the pins and corresponding tens-transfer gears in either the retracted, or inoperative, position of the transfer gears, or in the projected, or operative, position of the gears.

A tens-transfer actuator 223 is mounted on each actuator shaft 114 and has two teeth spaced apart angularly and longitudinally of the associated shaft, one of these teeth being effective to impart a unit space rotational movement to the square shaft to the right of the particular actuator shaft when the transfer gear on the square shaft is in operative position as the actuator shaft completes a cyclic rotation. The other tooth is effective to impart a rotational movement of one unit space to the square shaft to the left of the particular actuator shaft under corresponding conditions. Means are provided for holding the square shafts against rotation immediately before and after a tens-transfer movement of such shafts while permitting free rotation of the square shafts during digitation and tens-transfer actions, such means comprising a pair of Geneva gears 225, Fig. 2*a*, disposed in side-by-side relationship on each shaft 114 and a Geneva gear 224 mounted on each square shaft and engaging a corresponding gear 225, as more fully described in the Friden patents referred to above.

Each shaft-carried actuator 223 carries a spiral-shaped restore cam 226 which engages the ends of the corresponding detenting pins 211 projecting through the frame cross-members 212 and restores a pin which has been moved to the operative position of the associated tens-transfer gear 220 to the inoperative position of such gear after the tens-transfer has been made.

It is to be noted that by using elongated detenting pins 211 and providing thereon the arms 216 engaged by the tens-transfer levers 217 of the rear register, a single detenting pin 211 with the associated tens-transfer gear 220 is effective to accomplish the tens-transfer for either corresponding front or rear dial assembly 120 or 134.

VII. *Keyboard and selection mechanism* (*Figs. 1, 2, 3 and 11a*)

The keyboard of the machine, as generally indicated at 228 in Fig. 2, is a full keyboard of well-known form having ordinally arranged rows of digit keys 230, with the keys in each row numbered from "1" to "9" in a direction from the front end to the rear end of the keyboard, and with keys of like value being arranged in transverse rows or banks. A bank of combined "0," or ordinal keyboard clearing, and motor keys 231 extend across the keyboard in front of the bank of "1" keys, and a bank of motor keys or a single elongated motor key 232, extends transversely across the keyboard to the rear of the bank of "9" keys.

While observing Fig. 1, it may also be noted that a longitudinal row of machine conditioning keys extends along the left-hand side of the keyboard and includes, reading from front to rear of the keyboard, an addition key 235 for the front register, a subtraction key 236 for the front register, a keyboard clearing key 237, a repeat add or subtract key 238, an addition key 239 for the rear register and a subtraction key 240 for the rear register. It will also be noted that a row of control keys extends along the right-hand side of the keyboard and includes, reading from the front to the rear end of this row, a total taking or printing key 241 for the front register, a subtotal taking or printing key 242 for the front reigster, an additive transfer key 243, a subtractive transfer key 244, a total taking or printing key 245 for the rear register, and a subtotal taking or printing key 246 for the rear register. The construction of these conditioning and control keys and the associated mechanism will be later described.

Figures 2, 3:
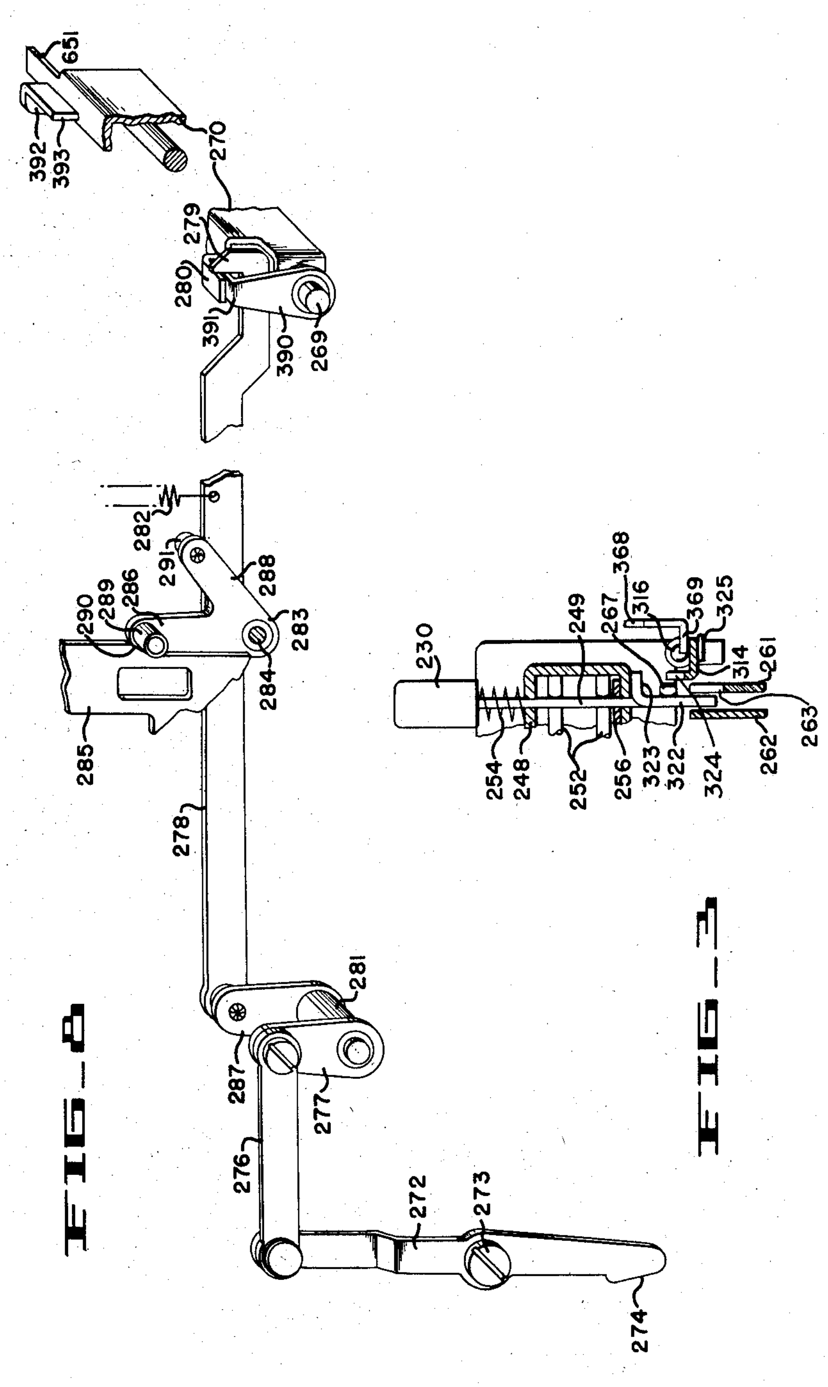
Fig. 3 is a fragmentary, transverse cross-sectional view of a single order selecting mechanism, such as taken along the plane indicated by the line 3—3 of Fig. 2.

The keyboard frame comprises ordinally disposed keyboard frame sections in the form of tubular bars 248, Fig. 3, of rectangular cross-sectional shape and equal in number to the number of ordinal rows of numeral keys, disposed in side-by-side relationship and provided medially of the width of their top and bottom sides with elongated slots spaced apart longitudinally of the bars and through which the flat stems 249 of the keys extend. The frame sections are secured in their side-by-side relationship by a front frame plate 250, Fig. 2, extending transversely of the keyboard across the front ends of the frame sections 248 and a rear frame plate 251 extending transversely of the keyboard at or near the rear ends of the frame sections 248. The key stems are guided for longitudinal movement through the frame bars by tie rods 252 extending through the side walls of the frame bars at locations spaced apart longitudinally of the frame bars and through elongated slots 253 provided in the key stems 249, these rods also serving to hold the frame bars together. The keys are resiliently urged to their raised position by compression springs 254 surrounding the key stems between the top sides of the frame bars 248 and the heads, or buttons, 255 on the upper ends of the key stems 249. Latch bars 256 extend slidably, one through each hollow frame section 248, and are provided with a series of elongated slots each encompassing one of the key stems 249 of that order, these bars being resiliently urged in their key latching direction of longitudinal movement by suitable springs, not illustrated, but well-known to the art. In all orders except the lowest, or right-hand, order, illustrated in Fig. 2, the latch bars are moved in one direction by cam formations on the key stems, and in the opposite direction by the associated springs to releasably latch the keys down, as is well known.

The "0" keys 231 omit the notch and cam formation of the value keys, and hence are not latched down by the latch bars 256 upon depression, for they serve, in that position, to initiate a machine operation, as will be later explained. However, lifting of a key 231 is operative to release a depressed key in that order. The means for accomplishing this purpose includes a series of ordinally spaced key releasing levers 247, Fig. 2, pivotally mounted on a rod 257 extending transversely of the keyboard in front of the front keyboard frame plate 250, the rod being rigidly mounted in the side frames 50 and 51. The upper end of each lever 247 is provided with an ear engaging a cam projection, not shown, on the stem of the respective key 231, whereby the lifting of a key 231 cams the upper end of the respective lever 247 forwardly (counter-clockwise in Fig. 2). Such rocking of a lever 247 causes the lower end thereof to engage the forward end of its latching slide 256, forcing the slide rearwardly to its key releasing position. Hence, the manually lifting of a front row "0" key will release any depressed digit key in the same row. The releasing lever 247 for the right-hand row of digit keys can be omitted for the corresponding latch bar 256 is individually controlled by other means, as will be later described in connection with Fig. 8.

The right-hand row of digit keys 230 and all of the "0" keys 231, as well as motor bar 232, are live keys, effective when depressed to establish an operating cycle of the machine, as will be later described in detail.

The keyboard 228 is mounted in the machine frame by the bearing of the lower edge of the rear transverse frame plate 251 of the keyboard frame on the upper edge of the transverse frame plate 58 of the machine, and by the rod, or bar, 257 which is threaded through apertured brackets 258 extending forwardly from the keyboard frame at the front corners thereof. The bar 257 is rigidly mounted in the machine frame, as by screws 259 (Figs. 6 and 11*a*) extending through apertures in the frame side plates 50 and 51 near the upper front corners of these plates and threaded into the corresponding ends of the rod 257.

The selection mechanism of the machine includes a plurality of slidable selection bars, generally indicated at 260 in Fig. 2, and disposed below the keyboard frame in parallel relationship to each other and to the rows of digit keys. These selection bars are arranged in pairs, with one pair disposed below each ordinal row of digit keys, and include bars 261 and 262 (Fig. 3) disposed at the right and left-hand sides, respectively, of the corresponding row of key stems. The right-hand bar 261 of each pair is provided with differentially angled cam notches 263 spaced therealong and disposed one below each of the corresponding digit keys from "6" to "9," inclusive. This bar is connected at its rear end to the rearwardly disposed selection gear 148 on the square shaft 145 of the same order as the digit key row. The left-hand selection slide 262 of each pair is provided with differentially angled cam notches 264 disposed one below each of the digit keys from "1" to "5" of the corresponding key row, and is connected at its rear end to the forwardly disposed selection gear 147 on the square shaft of the same order as the key row. The selection bars are supported on front and rear arms 265 and 266, each front arm 265 being pivotally connected at its upper end to the corresponding selection bar near the front end of the latter, and at its lower end to the transverse comb 56. Each rear arm 266 is pivotally connected at its upper end to the corresponding selection bar near the rear end of the keyboard and at its lower end to the transverse comb 57. A pin 267 projects laterally from each key stem near the lower end of the stem, these pins on the "1" to "5" keys projecting to the left from the key stems and being engageable with the cam notches 264 in the selection bar 262 at the left of the key stems to move this bar forwardly a selected increment for each of the "1" to "5" keys when depressed, and the pins 267 project to the right from the "6" to "9" key stems and engage the cam notches 263 in the selection bar 261 at the right-hand side of the key stems to move this bar selected increments to the front upon depression of selected ones of the "6" to "9" keys.

With this arrangement, the appropriate selection gear 147 or 148 will be brought into meshing alignment with the proper toothed sector of the corresponding actuator drum 146 in accordance with the selection of a digit key manually depressed. Thereafter, upon cycling of the machine, the selected digit value will be additively or subtractively entered in the dial assembly of the same order in the front or rear register as may be selected. Tension springs 268 connected between the front support arms 265 below the selection bars 260 and the selection bars forwardly of the front support arms, resiliently restore the selection slide bars to their rearward position when the digitation cycle is completed or the digit keys otherwise released.

At the end of the digitation cycle, the depressed digitation keys are released by a bail 270 which is pivotally mounted on a shaft 269 extending transversely of the front end of the keyboard frame and journalled at its ends in the frame side plates 50 and 51. The bail 270 is rockable into and out of engagement with the front ends of the key latching slides 256 to move these slides rearwardly against the force of the restoring springs, thereby causing these slides to release the keys that have been depressed.

A lever 272, Figs. 5 and 8, is pivotally mounted intermediate its length on the left-hand auxiliary frame plate 52 by a pivot pin 273. This lever has, on its lower end, a cam formation 274 which is engaged near the end of a digitation cycle of the machine by a pin 275 mounted on gear 108 eccentrically of the axis of rotation of this gear to impart to the lever 272 a counter-clockwise rocking movement, as viewed in Fig. 5. A link 276 is pivotally connected at one end to the upper end of lever 272 and extends forwardly from this lever to a pivotal connection at its forward end with the upper end of an arm 277, the lower end of which is secured to the outer end of a stub shaft 281 which extends through plates 51 and 52. This shaft carries on its inner end an upwardly extending arm 287, the upper end of which is pivotally connected to the rearward end of a hook link 278 which extends forwardly along the inner side of frame plate 51. The link 278 is provided at its forward end with an upwardly opening hook formation 279, shown in Fig. 8, engaging a tongue 280 projecting from the adjacent end of the bail 270, as shown in Fig. 8.

The front end of the hook link 278 is resiliently supported by a tension spring 282 in position such that its front end hook formation 279 engages the bail tongue 280. A bellcrank lever 283 is pivotally mounted at its angle on the plate 51 by a pivot pin 284 disposed just below the hook link 278 and forwardly of the flat stem 285 of the repeat key 238. The bellcrank lever has mutually divergent arms 286 and 288 extending upwardly from the pivot pin 284, the arm 286 carrying at its upper end a laterally projecting pin 289 engaged by an upwardly and forwardly inclined cam shoulder 290 on the front edge of the repeat key stem 285, while the arm 288 carries at its upper end a laterally projecting pin 291 which rides on the upper edge of the hook link 278. Thus, depression of the repeat key rocks bellcrank 283, clockwise in Fig. 8, and the pin 291 forces the front end of link 278 downwardly against the force of spring 282 to disengage the hook formation 279 from the bail tongue 280, so that the depressed digit keys will not be released to clear the keyboard while the repeat key is depressed.

A bellcrank lever 294, Fig. 11*a*, is pivotally mounted at its angle on a pivot pin 295 located near the lower front corner of the left-hand frame plate 51. This bellcrank has an upwardly extending leg 296 which bears against the front edge of the bail tongue 280 and a rearwardly extending leg 298 which extends past the outer side of the flat stem 300 of the keyboard clearing key 237. An abutment formation, or tongue, 301 projects outwardly from the key stem 300 near the lower end of this stem and is engageable with the upper edge of the lever arm 298. Thus, when the keyboard clearing key is depressed, the ear 301 rocks the lever 294, in a counter-clockwise direction as viewed in Fig. 11*a*, against the force of the lever restoring spring 302 and thereby rocks the bail 270 to release all depressed digit keys.

The key stem 300 of the keyboard clearing key 237 is mounted on the frame plate 51 by headed screws, or rivets, 304 and 305 secured to the plate 51 and extending through slots 306 and 307 provided in the key stem 300. The repeat addition key stem 285 is mounted on plate 51 by similar screws, or rivets 308 and 480 secured to the frame plate 51 and extending through corresponding slots, one of which is indicated at 309, in the key stem 285. The key 237 is resiliently urged to its raised position by the tension spring 310, and the key 238 is resiliently urged to its raised position by the tension spring 311.

VIII. *Live key mechanism* (*Figs. 2, 3 and 13*)

The live key mechanism comprises: a flanged bail 314 extending along the right-hand side of the keyboard frame and pivotally mounted at its ends on the front and rear keyboard frame plates 250 and 251 by the pivotal mountings 315 and 316; a flanged front bail 317 extending along the inner side of the front keyboard frame plate and pivotally mounted at its ends on the sides of the keyboard frame; and a rear bail 318 extending along the outer, or rear, side of the rear keyboard frame plate 251.

The front bail 317 is rocked against the force of a suitable restoring spring, not illustrated, whenever any one of the front "0" keys 231 is depressed. It has on its right-hand end a longitudinally projecting tongue 319 which bears on the top edge of the side bail 314 and rocks this bail whenever the bail 317 is rocked. The rear bail 318 is rocked whenever the rear motor key or keys 232 is depressed and, as this rear bail bears on a tongue 320 extending longitudinally from the rear end of side bail 314, the side bail rocks whenever the rear bail is rocked.

Each key stem 249 of the right-hand row of digit keys, i.e., the units order, is provided with an extension 322 inclined upwardly and forwardly from the lower end of the key stem. The extension terminates at its upper end in an outwardly projecting tongue, or abutment, 323 disposed immediately above the upper end of an upwardly projecting corresponding tooth 324 constituting a part of the side bail 314, whereby the side bail 314 is rocked whenever any one of the digit keys in the right-hand row of digit keys is depressed. Intermediate its length, the side bail 314 is provided with a thickened portion, or pad, 325 which is moved upwardly, counter-clockwise in Fig. 3, when the bail is rocked by depression of a "0" key, a motor key or one of the digit keys of the right-hand row of value keys.

Referring to Fig. 13, a bellcrank lever 327 is disposed at the inner side of the right-hand frame side plate 50 and is pivotally mounted at its angle on this plate by a pivot pin, or screw, 328. One arm 329 of lever 327 extends downwardly from the pivot pin 328 and through an opening 330 in the plate 50 to the outer side of this plate. It is provided on its lower end with a cam formation 331 which is engaged by a stud 332 carried on a disk 333 mounted on stub shaft 99 at the outer side of plate 50 to impart a rocking movement, in a counter-clockwise direction as viewed in Fig. 13, to the bellcrank lever 327 near the end of an operating cycle of the machine. The lever 327 has an arm 334 which extends forwardly from the pivot pin 328. A tension spring 335 connected between the lever arm 334 and the plate 50 below this lever arm, resiliently urges the lever 327 to rock in a clockwise direction, as viewed in Fig. 13. A second bellcrank lever 336 is pivotally mounted at its angle on a pivot pin, or screw, 338 mounted on the plate 50 at a location spaced forwardly on the plate from the pivot screw 328. This lever 336 has a rearwardly extending arm 340, the rearward end of which is connected to the forward end of the arm 334 of the bellcrank lever 327 by a pin-and-slot, or other suitable lost-motion pivotal, connection 341.

The bellcrank lever 336 has a second arm 342 extending upwardly from the pivot screw 338. A link 344 is connected at its forward end to the upper end of lever arm 342 by a pivotal connection 345 and extends rearwardly from this pivotal connection.

A clutch latch dog 346 (see also Figs. 6*a* and 7) is disposed at the outer side of plate 50 adjacent the single rotation clutch 87 and is mounted on the plate by a pivot pin, or screw, 347 from which the dog depends. The lower end of this dog engages a radial shoulder on the clutch pawl 89' carried by the clutch element 89 to hold the tooth of this pawl out of engagement with the clutch ratchet element 88 and the clutch thereby disengaged. However, when dog 346 moves from the pawl shoulder, the pawl can engage the ratchet 88 and transmit a full-cycle rotation from the gear 91 to the shaft 90, as disclosed in the Friden patents referred to above.

A link 348 is pivotally connected at one end to the clutch latch dog 346 above the pivot screw 347 by a pivotal connection 349. The link 348 extends upwardly and forwardly from the pivotal connection 349 and carries at its forward end a pin 350 (Fig. 13) which projects to the left from the link 348 through an opening 351 in plate 50 and through a slot 352 provided in the rearward end of link 344 and extending longitudinally of this link. A tension spring 353 connected between the pin 350 and the link 344 forwardly of this pin, resiliently maintains the pin seated against the forward end of the slot 352 for a purpose to be later described. A link 355, having at its forward end an aperture receiving the pin 350, extends rearwardly from this pin to the usual motor controlling switch of the machine.

When the bellcrank lever 327 is rocked, in a clockwise direction as viewed in Fig. 13, by the spring 335, rocking the bellcrank lever 336 counter-clockwise, this moves the links 344, 348, and 355 rearwardly, thereby actuating the clutch 87 and closing the motor controlling switch to establish an operating cycle of the machine. At the end of the machine operating cycle the bellcrank lever 327 is rocked in a counter-clockwise direction by engagement of stud 332 with cam formation 331 on lever arm 329, rocking the bellcrank lever 336 in a clockwise direction to move the link 344 forwardly. At this point links 348 and 355 cannot move forwardly for such movement is blocked by the conventional full-cycle mechanism described in the Friden patents mentioned above, such relative movement of link 344 and links 348, 355 being permitted by the pin-and-slot connection 350, 352. However, such relative movement tensions spring 353, so that as soon as the clutch plate 89 reaches its full-cycle position the spring moves links 348 and 345 forwardly, thereby opening the motor controlling switch and positioning the latch dog 346 to disengage the clutch as the cycle is completed.

The link 344 is releasably latched in its full-cycle, or limiting forward, position by a latch bar 358 pivotally mounted at one end on a pivot pin, or screw, 359 mounted on plate 50 above pivot screw 328, the latch bar extending forwardly from the pivot screw 359. A live point 360 is pivotally mounted on the forward end of bar 358 for upward and downward swinging movements relative to the bar, and has its downward swinging movements terminated at a position of the live point relative to the bar in which the live point extends longitudinally of the bar, by a tongue 361 extending from the live point over the upper edge of the bar at a location spaced forwardly of the pivotal connection 362 between the live point and the bar. A latching stud 364 projects upwardly and outwardly from the link 344 near the forward end of this latch bar and is engaged by a shoulder of the live point 360 to hold the link 344 in its full-cycle position. A guide washer 365 is secured to the link 344 and is disposed at the left-hand side of the live point 360 to maintain the live point in alignment with the stud 364.

A longitudinally bent lever 368 is pivotally mounted at one end on the pivot screw 359 and extends downwardly and forwardly from this pivot screw and has a leftwardly projecting tongue, or abutment formation, 369 on its lower end. This lever is resiliently urged to rock, in a clockwise direction as viewed in Fig. 13, by a spring 370 connected between the lever and the frame plate 50. This clockwise rocking movement of the lever is terminated at a position of the lever at which the abutment formation 369 is spaced forwardly from the pivot screw 359, by a stud 371 projecting from the plate 50 and engaging the rearward edge of the lever 368.

A pawl 374 is pivotally connected at one end to the lever 368 near the end of lever 368 remote from pivot screw 359 by a pivotal connection 375. This pawl extends upwardly from the pivotal connection 375 and has in the forward corner of its upper end a notch receiving a square stud 376 projecting laterally from the bar 358. A spring 377 connected between the pawl 374 and the live point 360, resiliently urges the live point downward and the pawl forwardly against a stop pin 378 projecting laterally from the link 344. A spring 379 connected between the lever 368 and the latch bar 358, resiliently urges the pawl carrying end of the lever toward the latch bar and applies pressure longitudinally of the pawl 374 between the pawl and the stud 376.

The spring 335 urges the link 344 rearwardly, as explained above, but the latch bar 358 acts as a sear engaging the stud 364 to releasably hold the link against such rearward movement. The lever 368 and pawl 374 together act as a trigger to release the latch bar 358 from the stud 364 and free the link 344 for rearward movement by the spring 335 to establish an operating cycle of the machine. The abutment formation 369 on the distal end of lever 368 is disposed immediately above and bears on the pad 325 (see Fig. 3) on the live key bail 314 so that, whenever this bail is rocked by depression of a live key of the keyboard, the lever 368 and pawl 374 are raised and the link 344 is triggered to establish a machine operating cycle.

The link 344 is automatically restored to its full-cycle position by stud 332 and lever 329, as described above, and is latched in that position by the latch bar 358 even though the lever 368 and pawl 374 are held up by a depressed live key at the time the link 344 is restored to its full-cycle position. When link 344 is moved rearwardly, pin 378 moves pawl 374 rearwardly against the force of spring 377 so that the pawl can move upwardly past stud 376, freeing bar 358 to return to position in which its bottom edge is in sliding engagement with the top of stud 364. This lowers stud 376 to a position at which it cannot be reengaged by the shoulder of pawl 374 until the depressed live key is completely released. Thus the stud 376 cannot be caught on the pawl shoulder with the key held partly depressed to cause the machine to short cycle. Since the stud 376 cannot be lowered below this position and be reengaged by the pawl shoulder, the bar 358 cannot be further lowered to latch the stud 364. The live point 360, however, is rocked upwardly against the force of spring 377 when spring 379 pulls bar 358 down upon release of stud 376 from pawl 374 and, as soon as stud 364 moves forwardly past the shoulder of the live point, the live point rocks down and relatches this stud. Thus the machine is stopped at the end of the cycle and cannot be recycled until the depressed live key is fully released and the same or another live key, or a control key, depressed.

A latching lever 380 is mounted on the right-hand side of the keyboard frame by a pivotal connection 381 and is urged to rock in a clockwise direction, as viewed in Fig. 2, about the pivotal connection 381 by a tension spring 382. The lever 380 is provided in its bottom edge, at a location spaced rearwardly from the pivotal connection 381, with a stop shoulder 383. A tongue 384 projects laterally from the right-hand key latch bar 256 and is releasably engaged by the stop shoulder 383 in the full-cycle condition of the machine, to hold the latch bar 256 in position to maintain the corresponding digit keys free.

A downwardly and forwardly directed extension 386 of the latch bar 358, Fig. 13, carries at its distal end a pin 387 which projects laterally to the left from extension 386 and extends under the rearward end of locking lever 380.

When a live digit key is depressed, raising the latch bar 358, the pin 387 raises the lever 380 and releases the right-hand key latch bar 256 to latch the depressed live key down until the end of the digitation cycle, so that the digit represented by the depressed live key will be entered in the selected register. The right-hand key latch bar 256 is restored to relatched, inoperative position at the end of a machine operating cycle when the bail 270 is rocked to release the latched-down digit keys, and is relatched in inoperative position by the lever 380.

Since it is necessary that any latched-down live digit key be released at the end of the cycle established by the depression of such key, even though other digit keys are retained in their latched-down condition by depression of the repeat key 238, as described above, in order to preclude a continuous, or repetitive, operation of the machine and erroneous multiplication of the entry value in the register, means, as illustrated in Fig. 8, are provided for moving the right-hand key latch bar 256 to its key releasing position at the end of each cycle, independently of the operation of the key releasing bail 270. Such means comprises the upwardly projecting arm 390 mounted at its lower end on shaft 269 at the inner side of left-hand frame plate 51, which arm is provided at its upper end with the laterally projecting tongue 391 which is disposed below the bail tongue 280 and is engaged by the hook formation 279 of link 278 to rock the shaft 269 regardless of whether or not the repeat key 238 is depressed. An arm 392 is secured to shaft 269 and projects upwardly from this shaft at the inner side of the righthand frame plate 50, in alignment with the units order latching slide 256. The arm 392 has on its upper end the tongue 393 extending laterally to the left and engaging the forward end of right-hand key latch bar 256 to move this bar to position in which it relatches in key releasing position each time the shaft 269 is rocked, as described above.

With this arrangement, a live key of the keyboard must be depressed to establish each digitation cycle of the machine, even for repeat operations. The control keys 241 to 246, however, are effective to establish machine operating cycles independently of the keyboard live keys, as will be later described.

IX. *Addition and subtraction control mechanism* (*Figs. 11, 11a, and 12*)

When it is desired to enter values additively into the front register 116, the machine conditioning key 235, Fig. 1, is depressed before a digitation selection is made on the keyboard. As shown in Figs. 11 and 11*a*, when the key 235 is depressed, a stud 395 projecting laterally from the stem 396 of this key engages an upwardly and rearwardly inclined cam surface 397 notched into the upper edge of a longitudinally movable link, or cam bar, 398 supported adjacent the lower ends of the conditioning key stems.

The key stem 396 is supported for longitudinal movement on the outer side of left-hand frame plate 51 by headed rivets 394 and 399 secured to the plate 51 at locations spaced-apart transversely of the plate and extending through corresponding slots, as indicated at 400, provided in the key stem 396 at locations spaced-apart longitudinally of the key stem, the key being resiliently urged to its upper position by a spring 401 connected between the key stem 396 and the plate 51. The bar 398 is supported near its front end on the upper end of an arm 404 pivotally mounted at its lower end on the plate 51 by a pivot screw, or stud, 405 and is supported at its rear end on the upper end of a lever 406 pivotally mounted intermediate its length on a rod 407 rigidly mounted on the plate 51.

Depression of key 235 imparts a rearward movement to bar 398, and imparts a counter-clockwise rocking movement to lever 406, as viewed in Fig. 11*a*.

The lower end of lever 406 is pivotally connected to the forward end of a link 408, the rearward end of which is pivotally connected to the lower end of a downwardly projecting extension 410 of the left-hand leg 154 of the bail, or gate, 152 controlling the front register 116, Fig. 11. When bar 398 is moved rearwardly by depression of key 235, the consequent rocking of lever 406 moves link 408 and the lower end of bail leg extension 410 forwardly, thereby moving gear elements 150 along the corresponding square shafts 145 to bring the forwardly disposed gears of the gear elements 150 into mesh with the corresponding beveled gears 123 of the dial assemblies, to turn the dial assemblies in an additive direction.

The machine conditioning key 236, which subtractively enters digitation values into the front register, is supported on the frame side plate 51 by headed screws, or rivets, 412 and 413 secured to the frame plate at locations spaced-apart transversely of the frame plate and extending through corresponding slots 414 and 415 spaced-apart longitudinally of the key stem 416, the key being resiliently urged to its raised position by a spring 417. A stud 418 projecting laterally from the key stem 416 near the bottom end of this stem engages an upwardly and forwardly inclined cam surface 419 notched into the upper edge of bar 398 to impart forward movement to the bar 398 when the key 236 is depressed. Forward movement of bar 398, acting through lever 406, imparts a rearward movement to link 408 and the lower end of bail extension 410, thereby rocking bail 152 in a direction to shift the rearwardly disposed gears of gear elements 150 into mesh with the corresponding dial shaft gears 123 to subtractively enter a digitation value into the front register.

A centering device, generally indicated at 420, resiliently urges the link 408 to its centered, or neutral, position in which the gears of gear elements 150 are out of mesh with the dial shaft gears 123. As the centering device 420 is identical with, and disposed directly behind, the centering device for the rear register drive setting bail 158, as viewed in Fig. 11, it is considered that the later detailed description of the centering device for the bail 158 will provide a sufficient disclosure for both centering devices.

A resilient connection, generally indicated at 422, is interposed between the link 408 and the bail leg extension 410. This connection comprises a pair of flat, opposed jaws 423 and 424, both pivotally connected at the lower end of the device to the lower end of a depending extension 425 of the link 408 by a pivotal connection 426. A pin 427, secured to, and projecting outwardly from, the link extension 425, is disposed between the jaws 423 and 424 above the pivotal connection 426. A second stud 428 projects from the bail extension 410 through a slot 429 in the link 408 and between the jaws 423 and 424 above the pin 427. A tension spring 430 is connected between the upper ends of the jaws 423 and 424 and resiliently urges the link 408 to a predetermined, centered position relative to the bail leg extension 410. This construction provides for resiliently resisted movement of the link in both directions relative to the bail leg extension to permit the bail 152 to be held in centered position during the second rotation of the actuator shafts in each operating cycle of the machine by mechanism shown in Fig. 12 and to be presently described.

The stem 432 of the conditioning key 239, which additively enters selected digitation values into the rear register of the machine, is slidably mounted on the frame side plate 51 by headed screws, or rivets, 434 and 435 secured to the plate 51 and extending through corresponding slots 436 and 437 spaced-apart longitudinally of this key stem 432. This key 239 is resiliently urged to its raised position by a spring 438. A stud 440 projects laterally from the key stem 432 near the lower end of the key stem, and, when key 239 is depressed, engages a rearwardly and upwardly inclined shoulder 441 notched into the upper edge of a slide bar 442. The bar is supported adjacent to the lower ends of the conditioning key stems by an arm 444 and a lever 445, the arm 444 being pivotally mounted on, and extending upwardly from, the pivot pin 405 and the arm 445 being pivotally mounted at an intermediate point on the rod 407. Thus, depression of key 239 imparts a rearward movement to bar 442, and that, in turn, rocks lever 445, counter-clockwise in Fig. 11*a*.

The stem 448 of conditioning key 240, which subtractively enters a selected digitation value into the rear register of the machine, is supported on frame side plate 51 by headed screws, or rivets, 449 and 450 secured to the side plate 51 and extending through corresponding slots, as indicated at 451, spaced-apart longitudinally of the key stem. The key is resiliently urged to its raised position by a spring 452. A stud 453 projects laterally from the lower portion of key stem 448 and engages an upwardly and forwardly inclined cam surface 454 notched into the upper edge of bar 442 to impart a forward movement to this bar when conditioning key 240 is manually depressed.

Depression of keys 239 and 240 will rock lever 445 in reverse directions corresponding to the sign character of the operation desired. The means for operating the sign character control, i.e., the plus-minus bail 158, comprises a link 455 (Fig. 11) which pivotally connects the lower end of lever 445 to the lower end of a downwardly projecting extension 456 of the leg 160 of rear bail, or gate, 158. Link 455 is connected at its rear end to the lower end of bail leg extension 456 through a resilient connection 458 similar in all respects to the resilient connection 422 between the link 408 and the bail leg extension 410.

With this arrangement, depression of the conditioning key 239 for additively entering selected digitation values into the rear register will rock the rear bail 158 in a direction to mesh the forward gears of the gear elements 151 with the corresponding dial shaft gears 136. Depression of the key 240 for subtractively entering selected digitation values into the rear register will rock the rear bail to mesh the rearwardly disposed gears of the gear elements 151 with the corresponding dial shaft gears. The resilient connection 458 provides for the placing of bail 158 in its neutral position by the mechanism shown in Fig. 12 and to be presently described, although the link 455 may be held in either of its operative positions.

The link 455 is resiliently urged to a neutral, or centered, position in which the gears of the gear elements 151 are out of mesh with the corresponding dial shaft gears 138 by a centering device, generally indicated at 460, comprising a pair of elongated and mutually opposed jaws 461 and 462 pivotally connected together and to the frame plate 51 at the lower end of the device by a pivotal connection 463. A stud 464 projects from the frame plate 51 between the jaws 461 and 462 above the pivotal connection 463 and a pin 465 projects from an upwardly directed extension 466 of link 455 between jaws 461 and 462 above stud 464. A spring 468 is connected between the upper ends of jaws 461 and 462 and resiliently urges the pin 465 to a position relative to the stud 464 corresponding to the centered, or neutral, position of bail 158. The centering device 420 for link 408 and bail 152 is disposed behind centering device 460 and is similar in all respects thereto, as stated above.

The notches in the upper edges of the bars 398 and 442 are so shaped that one only of the conditioning keys 235, 236, or the corresponding keys 239 and 240, can be depressed at the same time, the repeat key 238 and the clear key 237 being free of the bars 398 and 442 and depressible along with any one of the keys 235, 236, 239 or 240.

The add and subtract keys are releasably latched down in depressed position by a latch bar 470 which extends along the outer sides of the conditioning key stems and is supported at its front and rear ends on the upper ends of arms 471 and 472 pivotally mounted at their lower ends on the key stem mounting fasteners 394 and 450, respectively, and extending upwardly therefrom. The latch bar 470 is provided with laterally offset tongues, as indicated at 473, disposed one against the rear edge of each key stem 396, 416, 432 and 448. Each of these key stems is provided on its rear edge with an ear, or cam formation, as indicated at 474, having at its upper end a shoulder perpendicular to the longitudinal center line of the corresponding key stem, and a downward inclined cam surface at its bottom end. The tongues 473 are just below the corresponding ears 474 when the keys are in their elevated position, but when a key is depressed, the ear 474 on the key stem is moved below the corresponding tongue 473 on the latch bar 470. As the key is forced down, the latch bar 470 is moved rearwardly against the force of latch bar retracting spring 475 by the action of the cam surface of the ear against the corresponding tongue and, as soon as the detent is moved below the tongue, the spring 475 pulls the latch bar back and engages the tongue on the square top shoulder of the detent to latch the key down. Any depressed addition or subtraction key can be released to return to its "up" position by partial depression of any one of the other addition or subtraction conditioning keys.

The repeat key 238 has its own hold-down latch comprising a pair of star wheels 478 and 479 journalled in side-by-side relationship at the outer side of the lower portion of the repeat key stem on an outward extension of the lower fastener 480 which guides the key stem 285 on the frame side plate 51. The star wheels have the same, even number of lobes, or teeth, and are secured together in out-of-phase relationship, so that the lobes, or teeth, of one star wheel are opposite the low portions, or valleys, of the other star wheel; and the inner star wheel 479 is provided in each alternate low portion, or valley, thereof with a radially disposed notch 482. A spring-biased pawl 483 on the key stem 285 engages the teeth of the outer star wheel 478 and rotates the two star wheels one tooth space each time the key 238 is depressed. A holding pawl 484, pivotally mounted on the frame plate 51, engages the teeth of the outer star wheel and restrains the star wheels against counter rotation.

Whenever the star wheels are stopped, a valley, rather than a tooth, of the inner star wheel 479 is disposed at the bottom of this star wheel, whereupon a stud 485 projecting laterally from the lower portion of key stem 285 engages in the bottom valley of star wheel 479. When the stud 485 enters one of the notches 482 in the inner star wheel, the key 238 is free to rise to its "up" position but, when the stud engages in an alternate valley not provided with a notch, the key will be latched in its "down" position. The key 238 will thus be latched in its "down" position or freed to rise to its "up" position on alternate depressions thereof. Since the up-and-down movement of key stem 285 is much greater than the movement of the pawl 483 necessary to advance the star wheel 479 one tooth, there is ample lost motion between the key stem and the star wheel for the pawl to turn the star wheel.

Referring to Figs. 12 and 18, the cam 106 on stub shaft 99 has an arcuate lobe portion 488 extending through approximately 170 degrees of arc and an arcuate low portion 489 extending around the remainder of the cam. A three-armed lever 490 is pivotally mounted at the juncture of its arms on a pivot pin 492 secured to plate 50 above shaft 99. This lever has an arm 494 depending from pin 492 and carrying at its lower end a cam following roller 495 riding on the rearward side of cam 106. The lever 490 also has a tail portion 496 extending upwardly from pin 492 and carrying at its upper end a laterally projecting pin 497, the purpose of which will be later explained, and an arm 498 extending rearwardly from pin 492 and carrying at its rearward end a laterally projecting pin 499.

A stud 500 (see also Fig. 2) projects from the right-hand leg 155 of the front register control bail 152 through an arcuate slot 501 in frame plate 50. A similar stud 502 projects from the right-hand leg 161 of the rear register control bail 158 through an arcuate slot 503 in the plate 50. A lever 505, Fig. 12, disposed at the outer side of plate 50, is pivotally mounted intermediate its length on a stud 506 projecting outwardly from plate 50 midway between slots 501 and 503. This lever 505 is provided near its opposite ends with arcuate notches 507 and 508, respectively, adapted ot receive the studs 500 and 502. Near its forward end lever 505 is provided with a longitudinally extending slot 510 receiving the pin 499 projecting from lever arm 498. A spring 511 connected between lever 490 and plate 50 resiliently rocks lever 490 in a clockwise direction, as viewed in Fig. 12, when cam follower 495 rides off of cam lobe 488, thereby imparting a counter-clockwise rocking movement to lever 505 to engage the studs 500 and 502 in the lever notches 507 and 508.

When studs 500 and 502 are forced into notches 507 and 508, the register control bails 152 and 158 are moved to, and held in, their neutral, or full-cycle, positions to disable the gear drive connection between the square shafts 145 and the dial shafts 122 and 135 of the registers. The shape and timing of cam 106 is such that, during the first rotation of actuator shafts 114 and corresponding square shafts 145 of a machine operating cycle, the bails 152 and 158 are free of lever 505 and are conditioned by selection of conditioning keys 235, 236, 239 and 240 to additively or subtractively enter a value set up in the keyboard, selectively into the registers 116 and 117; and, during the second rotation of the actuator shafts and square shafts, the register controlling bails are moved to their neutral positions against the force of the resilient connections 422 and 458 by engagement of the bail studs 500 and 502 in the notches 507 and 508, respectively, of lever 505. Thus neither register can be operated during the second rotation of the actuator shafts during a machine cycle, this second rotation of the actuator shafts being utilized to zeroize the printing mechanism presently to be described.

X. *Printing mechanism* (*Figs. 2a, 4, 5, 6a, 11, 14, 15, 19a and 20a*)

The printing mechanism has a frame including spaced-apart and substantially parallel side plates 514 and 515 mounted at their front ends on a rear transverse plate 516 of the main frame of the machine and projecting rearwardly from this plate, the plate 516 being disposed rearwardly of, and substantially parallel to, the transverse plate 60. A platen shaft 518 extends between, and is mounted on, the side plates 514 and 515 near the rear extremities of these plates. A cylindrical platen 519 carrying the paper tape 79 is mounted on shaft 518 between the side plates of the printing mechanism.

The platen is driven by some well-known form of tape feed mechanism, not illustrated, and a printing ribbon will extend longitudinally of the platen adjacent the forward side thereof and will be fed by some known form of ribbon feed mechanism, also not illustrated.

A pivot shaft 520, Fig. 2*a*, parallel to platen shaft 518, extends between, and is carried by, plates 514 and 515 below, and forwardly of, platen shaft 518, and a print wheel drive gear shaft 522 parallel to shaft 520 extends between, and is secured to, plates 514 and 515 forwardly of shaft 520.

A plurality of print wheel carriers, generally indicated at 523 and in the form of bellcrank levers, are pivotally mounted at their angles on shaft 520 and are disposed in ordinal arrangement along this shaft. Each print wheel carrier 523 has an arm 524, extending upwardly from shaft 520 and carrying at its upper end a laterally projecting print wheel arbor 525, and an arm 526 extending rearwardly from shaft 520. Ordinally arranged print wheels 528 are journalled one on each arbor 525 in position to strike the forward side of platen 519. It will be understood that each print wheel comprises a type carrying disk portion and a gear portion disposed in side-by-side and concentric relationship. Each arm 524 also carries an arbor 531 on which is journalled an idler 532 constantly in mesh with the gear of the print wheel 528.

Print wheel drive gears 530 are journalled on shaft 522 in ordinal arrangement, being aligned with their respective idlers 532. When the print wheel carriers 523 are in their normal, inoperative, positions, shown in Fig. 2*a*, the drive gears 530 mesh with idlers 532, but when the carriers 523 are rocked to cause printing the idlers will become disengaged from their drive gears.

Springs 534 are connected between a tie rod 539 extending between the upper rear corners of the main frame side plates 50 and 51 and each of the print wheel carrier arms 526 at the distal ends of these arms, to resiliently urge the corresponding print wheel carriers 523 to rock, in a clockwise direction as viewed in Fig. 2*a*, and strike the print wheels against the platen 519. A crossbar 535 of a bail, generally indicated at 536, is disposed under the print wheel carrier arms 526 near the distal ends of these arms and is held parallel to the pivot shaft 520 by left-hand and right-hand bail legs 537 and 538 connected between shaft 520 and the corresponding ends of crossbar 535.

The shaft 520 is extended to the left (to the right in Fig. 14) beyond the left-hand side plate 514 of the printing mechanism frame and is journalled at its left-hand end in a bearing in a bracket 540, Fig. 5, projecting rearwardly from the cross plate 516 adjacent the outboard plate 52. Bail arms 537 and 538 are secured to shaft 520 to rock with this shaft and an arm 541 is secured to, and depends from, shaft 520 near bracket 540 and carries at its lower end a cam following roller 542.

A printing cam 544 of circular shape, Figs. 4 and 5, except for a depression 545 of limited angular extent and an abrupt leading edge, is engaged by the cam follower roller 542. The cam is concentrically journalled on an arbor 546 and is driven from shaft 90 at the same speed as this shaft by a shaft 547 extending along the outer side of the outboard frame plate 52 and having beveled gear driving connections 548 and 549 with the shaft 90 and arbor 546, respectively, the shaft 547 being journalled in spaced-apart brackets 551 and 552 mounted on the frame plate 52. The cam follower 542 rides on the circumferential edge of the cam 544 and moves the bail 536 to release the print wheel carriers 523 for movement of the print wheels 528 toward the platen 519 by the springs 534 when the cam follower 542 drops into the cam depression 545. This occurs at the end of the first rotation of the actuator shafts 114 during an operating cycle of the machine, the printing wheels being quickly restored to their home, or full-cycle, position and held against printing movement during the remainder of the machine cycle, or the corresponding single rotation of shaft 90. It is contemplated that the printing mechanism will be provided with a suitable zero foil mechanism to hold those print wheels to the left of the leftmost significant digit in their home position, thereby providing against printing zeros to the left of such significant digit.

Shafts 554 and 555, and aligned pins, or stub shafts, 556, Figs. 2*a* and 14, are disposed at progressively increasing distances below the shaft 522 in the order indicated and in parallel relationship to each other and are supported at their ends in brackets 557, 558 and 559, respectively, Fig. 14. A plurality of idler gear spools 560 nested on suitable quill shafts are journalled on shaft 554 at locations spaced-apart along this shaft, one of the gears of each spool meshing respectively with the print wheel drive gears 530 and the other gear of the respective spools meshing with one of the gears of an associated idler gear spool 561. The gear spools 561, similarly mounted on suitable quill shafts, are rotatably mounted on shaft 555 at spaced locations thereon. The idler spools 561 are driven by a series of ordinally arranged gears 562 which are mounted on shaft 556 at locations spaced apart therealong.

Print wheel driving square shafts 564, Figs. 2*a* and 14, are disposed one below each register driving square shaft 145 and below the actuator shafts 114 in parallel relationship to the square shafts 145, and are journalled at their front ends in apertures in the front transverse frame plate 58 and near their rear ends in apertures in the rear transverse frame plate 60 through which they extend. Each actuator shaft 114 carries a second actuator drum 565, similar to the drums 146 and having toothed sectors of graduated length, such secondary actuator drums being disposed forwardly of the corresponding primary drums 146 and angularly displaced 180 degrees therefrom. Each lower square shaft 564 carries a pair of selection gears 566 and 567 slidably mounted thereon for rotation therewith and engagement with the corresponding secondary actuator drum 565.

Slide bars extend through apertures in the transverse plate 58 and are arranged in ordinal pairs of side-by-side bars disposed one pair below each lower square shaft 564. The two bars 568 and 569 of each pair are connected, respectively, to the corresponding selection gears 566 and 567 by a yoke 570 which extends upwardly from the rear end of bar 568 and engages the hub of gear 566 and a yoke 571 which extends upwardly from the rear end of slide bar 569 and engages the hub of actuator gear 567. The slide bar 568 is pivotally connected at its front end to the lower end of a lever 573 pivotally mounted intermediate its length on a rod 574 extending transversely of the machine and having in its upper end a notch receiving a pin projecting from the left-hand key actuated selection bar 262 of the pair of selection bars 261 and 262 of the same order. The slide bar 569 is pivotally connected at its front end to the lower end of a lever 575 pivotally mounted intermediate its length on the transverse rod 574 and having in its upper end a notch receiving a pin 576, Fig. 2, projecting from the right-hand selection bar 261 of the pair of selection bars of the same order.

With this arrangement, when a value is set up in the keyboard the lower selection gears 566 and 567 will be shifted relative to the corresponding secondary actuator drums 565 in the same manner and to the same extent as the upper selection gears 147 and 148 of the same orders are shifted relative to the primary actuator drums 146. Thus, when the machine cycles, the lower square shafts 564 will be turned the same angular extent as the upper square shafts 145 of the same orders. The lower square shafts are not, however, provided with tens-transfer devices.

A pair of spaced-apart bevel gears 578 and 579, Figs. 2*a* and 11, are journalled on the rear end portion of each lower square shaft 564, the rear end of each of these shafts being supported by a bearing 580, Figs. 2 and 15, mounted on a transverse frame bar 581. Beveled gears 584 are journalled on studs 556 and disposed on a yoke 559, one adjacent each lower square shaft 564, the gears 584 lying between, and in mesh with, the pair of beveled gears 578 and 579 rotatably journalled on the corresponding square shaft. Each of the beveled gears 578 and 579 of each pair is provided with a hub having a notched end remote from the corresponding beveled gear 584. Collars 585 and 586 are slidably mounted on each shaft 564 for rotation therewith and disposed in opposition to the notched outer ends of the hubs of the corresponding pair of beveled gears 578 and 579, respectively.

The collars have projecting jaws engageable with the notched ends of the corresponding gear hubs to drivingly connect the shafts 564 to the corresponding gears 578 and 579, the two collars on each shaft being joined by a U-shaped yoke 588 extending around each group of gears 578, 579 and 584 and having its opposite ends engaged with the collars 585 and 586. The yoke has a length such that, when it is in its neutral, or central, position, both collars 585 and 586 are out of engagement with the hubs of the associated gears 578 and 579; when the yoke is moved rearwardly, collar 585 is engaged with the hub of gear 578 to drive gear 584 in one direction; and when the yoke is moved forwardly, collar 586 is moved into engagement with the hub of gear 579 to drive the gear 584 in the opposite direction.

All of the yokes 588 are secured intermediate their length to the crossbar 590. Fig. 2*a*, of a bail, generally indicated at 591, supported by legs 592 and 593 extending one from each end of the crossbar and pivoted to side plates 50 and 51, respectively, below the crossbar, as indicated at 594. The bail is resiliently urged to its neutral, or central, position by a resilient centering device 595, Fig. 6*a*, of well-known construction, mounted on the outer side of the frame plate 50. The bail is rocked in both directions from its centered position in each cycle by a bellcrank lever 596, the operation of this lever being such that the front collars 585 are engaged with the front gears 578 during the first half of each machine operating cycle to turn the print wheels in a direction to enter a value therein. The collars 585 are then disengaged from the gears 578 and the rear collars 586 are engaged with the rear gears 579 during the last half of each operating cycle to turn the print wheels back to their "0" positions, the bail being returned to its neutral position to disengage all collars from the corresponding beveled gears at the end of each operating cycle.

The spur gears 562, Fig. 15, are disposed, one adjacent each beveled gear 584, each of these spur gears being rigidly secured to one side of the corresponding beveled gear and disposed concentrically therewith. The spur gears at one end of the gear spools 561 on shaft 555 mesh respectively with the spur gears 562 on shaft 556, the gears 600 on the other end of the spool meshing with corresponding spur gears at one end of the gear spools 560 on shaft 554. This arrangement permits the ordinal spacing of the square shafts (normally about ⅝ inch) to the conventional spacing of a printing mechanism (normally about ⅛ inch).

The central gear, as shown in Fig. 14, on shaft 555 is a true spur gear and is mounted directly on the shaft for the printing mechanism and is centrally located in the machine. The other gears on this shaft comprise gear spools and are thus arranged: At each end of shaft 555 there is a set of three sleeves 603 of different lengths disposed one within the other, and at each side of the center gear there is a set of two sleeves of different lengths disposed one within the other, these sleeves transmitting rotational movements from the widely spaced gears 561 to the more closely spaced corresponding gears 600.

In addition to the gears on gear spools 560 meshing with the gears 600, the spools carry additional gears 604 meshing respectively with the print wheel drive gears 530, coaxial sleeves 605 receiving shaft 554 connecting gears 604 to corresponding gears 560, the gears 604 being more closely spaced than the gears 560. The arrangement is such that the first order gear 561 on shaft 555 is connected by the inner sleeve 603 of the three overlapping sleeves on the corresponding end of shaft 555 to the inner one of the corresponding group of three gears 600, the second order gear 561 to the intermediate gear 600 and the third order gear 561 to the outer gear 600. The inner gear 600 is connected through adjacent gears 560 and 604 to the first order print wheel drive gear 530 on shaft 522, the intermediate gear 600 is connected to the intermediate gear of a corresponding group of three gears 560, while intermediate gear 560 is connected through an intermediate sleeve 605 and a gear 604 to the second order drive gear 530, and the outer gear 600 is connected to outer gear 560 connected by an inner sleeve 605 and a gear 604 to the third order drive gear 530. The same condition prevails for the other sleeve connected gears.

The purpose of the above-described gear and sleeve transmission mechanism is to reduce the wide spacing of the gears 562 connected to the beveled gears 584 to the close spacing of the side-by-side print wheels 528.

The bellcrank lever 596, Fig. *6a*, is pivotally mounted at its angle on a pivot pin 606 secured to side plate 50 below the bail 591 and has an arm 607 extending upwardly from the pivotal mounting 606 and connected at its upper end to the lower end of bail leg 592 by a pivot pin 608 extending through a slot 609 in frame plate 50. The lever 596 also has an arm 610 extending forwardly from the pivotal mounting 606, which arm is provided in its forward end with a longitudinally extending slot 611.

A second bellcrank lever 612 is mounted at its angle on a pivot pin 614 mounted on plate 50 below shaft 90 and has an arm 615 extending rearwardly from pivotal mounting 614, the arm carrying at its rearward end a laterally projecting pin 616 received in the slot 611. The lever 612 also has an arm 618 extending upwardly from pivotal mounting 614 and carrying at its upper end a cam following roller 619 riding on the peripheral edge of print wheel drive controlling cam 92. A spring 617 connected between lever arm 618 and plate 50 resiliently maintains the cam follower in contact with the cam.

The cam 92 has oppositely disposed lobe and decreased radius portions, and connecting chords as shown in Fig. *6a*. The cam is so timed that during the first rotation of the actuator shafts 114 in a machine operating cycle, while a value set up in the keyboard is being entered in a register, the cam follower 619 rides onto the lobe of cam 92 and rocks the bellcrank levers 612 and 596 and bail 591 in a direction to engage the forward collars 585 with the forward beveled gears 578, Fig. 15, and turn the proper number of print wheels 528 from the right-hand end of the print wheel assembly to the same entry value. At the end of the first rotation of the actuator shafts 114 and activated square shafts 564, the printing cam 544 brings its depression 545, Fig. 5, under cam follower 542, releasing printing bail 536 and printing takes place. Cam follower 619 then passes from the lobe to the reduced portion of cam 92 and spring 620 rocks levers 612 and 596 and bail 591 to engage the rear collars 586 with the rear beveled gears 579 and return the print wheels to their "0" positions during the second rotation of the actuator shafts and activated square shafts while the register drives are held out of operation, as explained above. At the end of each machine cycle, cam follower 619 rides onto a portion of cam 92 between the lobe and low portion thereof and restores the bail 591 to its central position disengaging the print wheel drive.

XI. *Control keys* (*Figs. 6, 6a, 19, 19a, 20 and 20a*)

The flat stems of the control keys 241 to 246, inclusive, are mounted on the side plate 50 for longitudinal movement by well-known means, such as headed screws or rivets secured to the frame plate and extending through slots spaced apart longitudinally of the key stems, as in the case of the conditioning keys 235 to 240, inclusive, described above, the control keys being resiliently urged to their raised position by suitable springs, not illustrated.

A clutch controlling slide bar 620, Fig. 6, extends along the lower portions of the control key stems and is supported at locations spaced apart therealong by links 621 and 622 pivotally supported at their upper ends on pivot screws 623 and 624 secured to plate 50 and pivotally connected at their lower ends to slide bar 620.

The bar is provided at locations spaced apart along its upper edge with notches, as indicated at 625 to 630, inclusive, each of which notches have an upwardly and rearwardly inclined cam surface at its rear upper corner. The key stems 632, 633, 634, 635, 636 and 637, Figs. 6, 20 and 19, respectively, of the front register total key 241, the front register subtotal key 242, the additive transfer key 243, the subtractive transfer key 244, the rear register total key 245 and the rear register subtotal key 246, respectively, carry laterally projecting studs, as indicated at 638 to 643, respectively, which engage the cam edges of the corresponding notches 625 to 630 in bar 620 to impart a rearward movement to the bar against the force of bar restoring spring 644 whenever one of the control keys is depressed. An extension 645 of bar 620 extends upwardly and rearwardly from the rear end of the bar and bears at its distal end against pin 350 to impart a rearward movement to clutch controlling link 348 and switch controlling link 355 whenever bar 620 is moved rearwardly, and thereby establish an operating cycle of the machine.

A key latch-down bar, Figs. 6 and 19, extends along the outer sides of the control key stems above the bar 620 and is supported on plate 50 by having the pivot screws 623 and 624 extend through slots spaced apart along, and extending longitudinally of, this bar. A spring 649 urges the bar forwardly. At its forward end the bar is provided with a hook formation 650 engaging a tongue 651 extending from the adjacent end of the keyboard key release bail 270 through an aperture in plate 50. The bar 648 is provided at spaced-apart locations along its lower edge with laterally offset ears, or tabs, as indicated at 653 to 658, inclusive, and the control keys are provided intermediate the length of their rear edges with shoulder formations, as indicated at 660 to 665, inclusive, which engage under the corresponding tabs on the latch bar 648 to hold a depressed control key down until the coincident machine cycle has been completed.

When a control key is depressed, a slight rearward movement is imparted to bar 648 as the control key stem shoulder passes the corresponding tab and this rocks the bail 270 sufficiently to release any keyboard key that may be latched down and thus clear the keyboard at the beginning of any control key initiated cycle of the machine. At the end of such a cycle a lever 666 (Fig. 19) suspended from a pivot screw 667 is rocked by a stud 668 on cam 102, the stud engaging the lower end of the lever and moving the lower end forwardly away from a stop pin 669 against the force of a holding spring 670. When lever 666 is rocked by stud 668 it pulls on a link 671 connected to the lever above pivot screw 667 and to bar 648 to move bar 648 rearwardly against the force of springs 649 and 670, a distance sufficient to release any latched-down control key.

A slide bar 674 (Fig. 20) extends along the outer sides of the control key stems above the latch-down bar 648 and is supported at its front end by a pin 675 extending through a longitudinally extending slot 676 in the bar. At its rear end the bar 674 is pivotally connected to the upper end of an upwardly extending arm 678 of a bellcrank lever 680 pivotally mounted at its angle on pin 681 and having a rearwardly extending arm constituting the latch 190, Fig. 20*a*.

The slide bar 674 is provided in its upper edge with notches 683, 684, 685, 686, and 687, of which the notches 683, 685 and 686 have at their upper front corners upwardly and forwardly inclined cam surfaces for imparting forward movements to the bar. The notches 684 and 687 are of rectangular shape and have a width at least as great as the extent of longitudinal movement of the bar, and a depth sufficient to permit full depression of keys 242 and 245, both of which carry pins that would otherwise engage the bar.

The stem 632 of the front register total key 241, Fig. 6, and the stems 634 and 635, Fig. 20, of the transfer keys 243 and 244 carry studs 690, 691 and 692, respectively, which engage the cam surfaces at the upper forward corners of the corresponding notches 683, 685 and 686 to impart a forward movement to bar 674 and a counter-clockwise rocking movement to bellcrank lever 680 when any one of the control keys 241, 243 and 244 is depressed. The other arm 190 of lever 680 carries at its distal end the hook formation 191, Fig. 20*a*, engaging the stud 192 on the upper end of front register clearing lever 184, as previously described. Thus, whenever the front register total key 241, the additive transfer key 243, or the subtractive transfer key 244 is depressed, the lever 184 is released from the hook 191 to clear the front register, that is, rotate the front register dials to their "0" positions, during the latter half of a machine operating cycle established by depression of any one of these keys.

An outer slide bar 694, Figs. 6 and 19, extends along the outer side of inner slide bar 674 and is supported at its front end by pin 675 received in a longitudinally extending slot 695 in the bar, and near its rear end by riding on the pivot screw 667. This bar is provided at locations spaced apart along its upper edge with notches 696, 697, 698 and 699, provided at their front upper corners with upwardly and forwardly inclined cam surfaces. The cam surface of the front notch 696 is disposed below the stud 690 carried by the front register total control key stem 632; the cam surface of the second notch 697 is disposed below a stud 700 carried by the front register subtotal key stem 633; the cam surface of the notch 698 is disposed below a stud 701 carried by the rear register total key stem 636, and the cam surface of the rear notch 699 is disposed below a tongue 702 projecting laterally from the rear register subtotal key stem 637, which tongue has another purpose later to be described.

The bar 694 is moved forwardly against the force of its restoring spring 703 whenever any one of the total or subtotal keys is depressed, but the studs 691 and 692 on the transfer keys do not reach this bar and the bar is, therefore, not moved by depression of either of the transfer keys.

A three-armed outer lever 705, Figs. 6 and 6*a*, is pivotally mounted at its junction on pivot screw 681 and has an arm 706 extending rearwardly from the pivot screw 681, an arm 707 extending downwardly from the pivot screw and carrying at its lower end a cam follower 708 adapted to ride on the peripheral edge of the register neutralizing cam 105, and a tail portion, or third arm, 709 extending upwardly from the pivot screw 681 and carrying at its upper end a laterally projecting pin 710. A latch bar 712 is pivotally mounted on, and extends rearwardly from, the pivot screw 667, and has at its rear end a hook formation 713 which receives the pin 710. The rear portion of the bottom edge of the latch bar 712 is upwardly and rearwardly inclined to form a cam edge. A pin 715 projecting outwardly from bar 694 engages this upwardly and rearwardly inclined portion of the bottom edge of the latch bar to raise the rear end of the latch bar against the force of spring 716 and release the pin 710 from the hook 713 when the bar 694 is moved forwardly. When the pin 710 is released from hook 713, the bellcrank lever 705 is rocked by spring 717, in a clockwise direction as viewed in Fig. 6, when the cam follower 708 rides off of the narrow lobe of cam 105.

As shown in Fig. 6*a*, a lever 718 is pivotally mounted intermediate its length on pivot pin 506 and is provided near the front end of its lower edge with an arcuate notch 720 and near the rear end of its upper edge with an arcuate notch 721, these notches being effective to receive the studs 499 and 502, respectively, and move the front and rear register drive control bails 152 and 158 to their centered, or neutral, position when lever 718 is rocked, in a counterclockwise direction as viewed in Fig. 6*a*. A pin 722 projects laterally from the rear end of bellcrank lever arm 706 and is received in a longitudinally extending slot 723 in the front end of lever 718, so that lever 718 is rocked in a counter-clockwise direction (as viewed in Fig. 6*a*) whenever bellcrank lever 705 is rocked by spring 717 in a clockwise direction, as explained above.

Thus, both the front and rear registers are centralized, or rendered inoperative, whenever one of the total or subtotal control keys is depressed, the lever 718 being returned to its inoperative, or full-cycle, position to release the bail studs 499 and 502, by the cam 105 at the end of the machine operating cycle and being relatched in an inoperative position by the latch lever 712 when the depressed total or subtotal key is released at the end of the cycle.

As explained above, when the front register total key 241, Fig. 6, is depressed, it releases the front register clearing mechanism by moving the bar 674, Fig. 20, forwardly, the front register subtotal key having no such effect since the stud 700 on the stem 633 of this key moves into the rectangular notch 684 in bar 674 when the subtotal key is depressed. Thus, when a total is taken from the front register, this register is cleared, or zeroized, but when a subtotal is taken, the accumulated total is left in the register. In like manner, when the rear register subtotal key 246 is depressed, the rear register is not cleared, or zeroized, as there is no connection between the key 246 and the rear register clearing mechanism. However, when the rear register total key 245 is depressed, the rear register clearing mechanism is operated by the substantially simultaneous operation of slide 694 and the rocking of an arm 705 (Fig. 19). The stud 701 carried by the stem 636 of this key engages the front end portion of an arm 725 of a lever 726 pivotally mounted intermediate its length on the pivot pin, or screw, 681 and provided at its rear end 205 with a hook 206, Fig. 19*a*, engaging the pin 207 carried by lever 200. When the rear register total key is depressed, this swings the lever 726 in a direction to raise the rear end of the lever against the force of spring 728, freeing the lever 200 to clear the rear register, in the manner described above, when the machine cycles.

Three-armed levers 730 and 731, as shown in Fig. 20, are mounted at their junctions on pivot pin 681. The lever 730 has an arm 732 extending rearwardly from the pivot pin, an arm 733 extending downwardly from the pivot pin and carrying at its lower end a cam following roller 734 adapted to engage the peripheral edge of the positive transfer cam 104, and a third arm, or tail portion, 735 extending upwardly from the pivot pin 681 and carrying at its upper end a laterally projecting pin 736. The three-armed lever 731 has a rearwardly extending arm 738, an arm 739 extending downwardly from the pivot pin 681 and carrying at its lower end a cam following roller 741, shown in Fig. 18, similar to the roller 734, adapted to ride on the peripheral edge of the negative transfer cam 101, and a third arm, or tail portion, 740 extending upwardly from the pivot pin 681 and carrying at its upper end a laterally projecting pin corresponding to the pin 736.

Levers 742 and 743, as shown in Fig. 20*a*, are pivotally mounted intermediate their length on pivot pin 506 and both have near the forward ends of their bottom edges, arcuate notches, as indicated at 744, adapted to receive the stud 499 and move the front register drive control bail 152 to its centered position to disconnect the front register drive whenever either of the levers 742 or 743 is rocked in a counter-clockwise direction, as viewed in Fig. 20*a*. Near the rear end of its upper edge the lever 742 is provided with a notch 745 which engages the stud 502 and moves the rear register drive control bail 158 to a position to provide a negative, or subtractive, drive for the rear register when lever 742 is rocked in a counter-clockwise direction. Lever 743 is provided near the rear end of its top edge with a notch 746 which receives stud 502 when lever 743 is rocked in a counter-clockwise direction and moves bail 158 to provide a positive, or additive, drive for the rear register.

At their forward ends, levers 742 and 743 are provided with longitudinally extending slots, as indicated at 748 for lever 742. At their rear ends, lever arms 732 and 738 carry laterally projecting pins, as indicated at 749 for lever arm 732, respectively received in the slots in levers 742 and 743 to rock these levers counter-clockwise whenever the corresponding three-armed levers 730 or 731 are rocked clockwise by individual springs, as indicated at 750, for the lever 730, when the bellcrank levers are released and the cam followers carried thereby ride off of the lobes of the cams 104 and 101.

Levers 752 and 753, Fig. 20, are pivotally mounted intermediate their length on pivot pin 667. Lever 752 has a raised front end portion extending under stud 691 carried by positive transfer control key stem 634. At its rear end this lever is provided with a hook formation receiving the pin, not shown, projecting laterally from the upper end of three-armed lever 731 to hold this lever against movement by the associated spring 750 to put the rear register into positive drive. When key 243 is depressed to raise the hook on the rear end of lever 752 from the associated pin and the machine cycles to move the lobe of cam 101 away from cam follower 741, a positive driving connection will be established for the rear register.

Lever 753 has a raised front end portion extending under stud 692 carried by stem 635 of negative transfer key 244 and has at its rear end a hook formation 754 receiving pin 736. When negative transfer key 244 is depressed, hook formation 754 is raised from pin 736 to free levers 730 and 742 to establish a negative drive for the rear register.

Notches, as indicated at 755, are provided in the upper edges of levers 752 and 753 above the corresponding rear end hook formations. Whenever either hook formation is raised by depression of the corresponding key 243 or 244, the pin 497, projecting from the upper end of arm 496 of bellcrank lever 490, Fig. 12, is received in the corresponding notch to hold lever 490 against movement and thereby disable the register timing mechanism from connecting the register drives by moving the bails 152 and 158 to neutral position during the second rotation of the actuator shafts in a machine cycle. This enables the transfer keys to maintain the rear register in either positive or negative drive during the last half of a transfer cycle of the machine.

XII. *Register sensing and back-transfer mechanism (Figs. 2, 2a, 4, 6, 6a, 9, 11, 17a to 17j, 10, 18, 18a, 14 and 16)*

A register sensing cam, or disk, 132 is mounted on each dial shaft 122 of the front register and a cam 142 is mounted on each dial shaft 135 of the rear register, as described above, adjacent the top surface of the corresponding register frames 70 and 71. Each sensing cam, as shown in detail in Figs. 17*a* to 17*j*, inclusive, comprises a substantially circular disk centrally apertured to receive the corresponding dial shaft and provided with angularly spaced-apart radial notches 758 arranged in two groups, or series, with the notches of each group progressively increasing depth in the direction of additive rotation of the corresponding dial shaft, and with a substantial length of arc between each notch. The sensing members which cooperate with the sensing cams are associated with the ordinally related selection bars 261, 262, so that when either sensing member engages a notch the other will be blocked by the periphery of the cam. Stated another way, each cam disk has a number of radial notches equal to the number of digits on the corresponding dials 128 or 141, usually nine, there being no notch for the "0" marking on the dial. The notches are disposed in sequence in relation to the dial digits. The notches are divided into two series around the dial, each series being slightly offset with respect to those of the other series. The first series corresponds to the digits "1" to "5," inclusive, in the same manner that the cam notches in the right-hand selection bar 261 of each pair of selection bars correspond to this same series of digits, while the second series of notches 758 corresponds to the digits "6" to "9," inclusive, in the same manner that the cam notches in the left-hand selection bar 262 of each pair of selection bars correspond to the series of digits from "6" to "9." In one series the connecting arc, or periphery of the cam between notches, lies on the right side of the notch and in the other series it lies to the left thereof. The notches of the first series, or group, increase in depth from "1" to "5" and the notches of the second series or group increase in depth in four incremental steps (corresponding to values from "6" to "9"), the increase in depth of the notches of each series being progressive away from the notch corresponding to the lowest order digit of the series and in incremental steps corresponding to the number of the corresponding digit in the particular series. Figs. 17*a* to 17*j*, inclusive, show the consecutive rotational positions of a register sensing cam for the corresponding consecutive digit positions of the associated dial assembly.

As shown in Fig. 2*a*, a rod 760 extends transversely of the machine in front of, and in parallel relationship to, the rod or shaft 69. These two rods are supported at their ends by bracket plates disposed inwardly of the frame side plates 50 and 51, respectively, and mounted thereon, the left-hand bracket plate being shown in Fig. 11 and indicated at 762.

A plurality of ordinally arranged pairs of levers 763 are pivotally mounted intermediate their lengths on shaft 760 and extend above and below this shaft, and a plurality of ordinally arranged pairs of levers 764 are pivotally mounted intermediate their length on shaft 69 and extend above and below this shaft. Links 765 are pivotally connected at their front ends, one to each of the levers 763 at the upper ends of these levers and are pivotally connected at their rear ends one to each of the levers 764 at the upper ends of the latter. Each link 765 is connected between corresponding levers 763 and 764 aligned with each other ordinally, or longitudinally, of the machine, which links pass through a fixed guide comb 766. The number of links 765 is equal to the number of selection bars 261 and 262 in the selection mechanism under the keyboard. Sensing fingers 768 are secured, one to each link 765 and extend rearwardly from these links to the front portions of the peripheral edges of the front register sensing cams, or elements, 132.

Links 770 are pivotally connected at their front ends, one to each lever 763 at the lower ends of these levers and at their rear ends, one to each of the levers 764 at the lower ends of the latter levers, each of these links 770 also being connected between corresponding levers 763 and 764 aligned longitudinally of the machine and all passing through a fixed guide comb 771. Each set of interconnected levers and links constitutes a quadrilateral geometric figure, so that the center line of each link 765 will remain substantially parallel to a fixed datum line regardless of forward and rearward movements of the links.

The front edge of each front lever 763 bears against the rear edge of a movable bail 772, Fig. 16, below shaft 760 and tension springs 773 connected one between each link 770 at the rear end thereof and the comb 771, resiliently urge the links 770 forwardly and press the levers 763 against the movable bail 772. Alternate links 770, those associated with the "1" to "5" selection bars, are provided at their front ends with depending shoulders 774 which bear against the corresponding yokes 775 connecting the left-hand selection bars 262 to the hubs of the front selection gears 147, and the other links 770 are provided intermediate their lengths with depending shoulders, or abutment formations, 776 which engage the yokes 777 connecting the right-hand selection bars 261 to the corresponding rear selection gears 148, as shown in Figs. 2*a*, 11 and 16.

Figure 17:
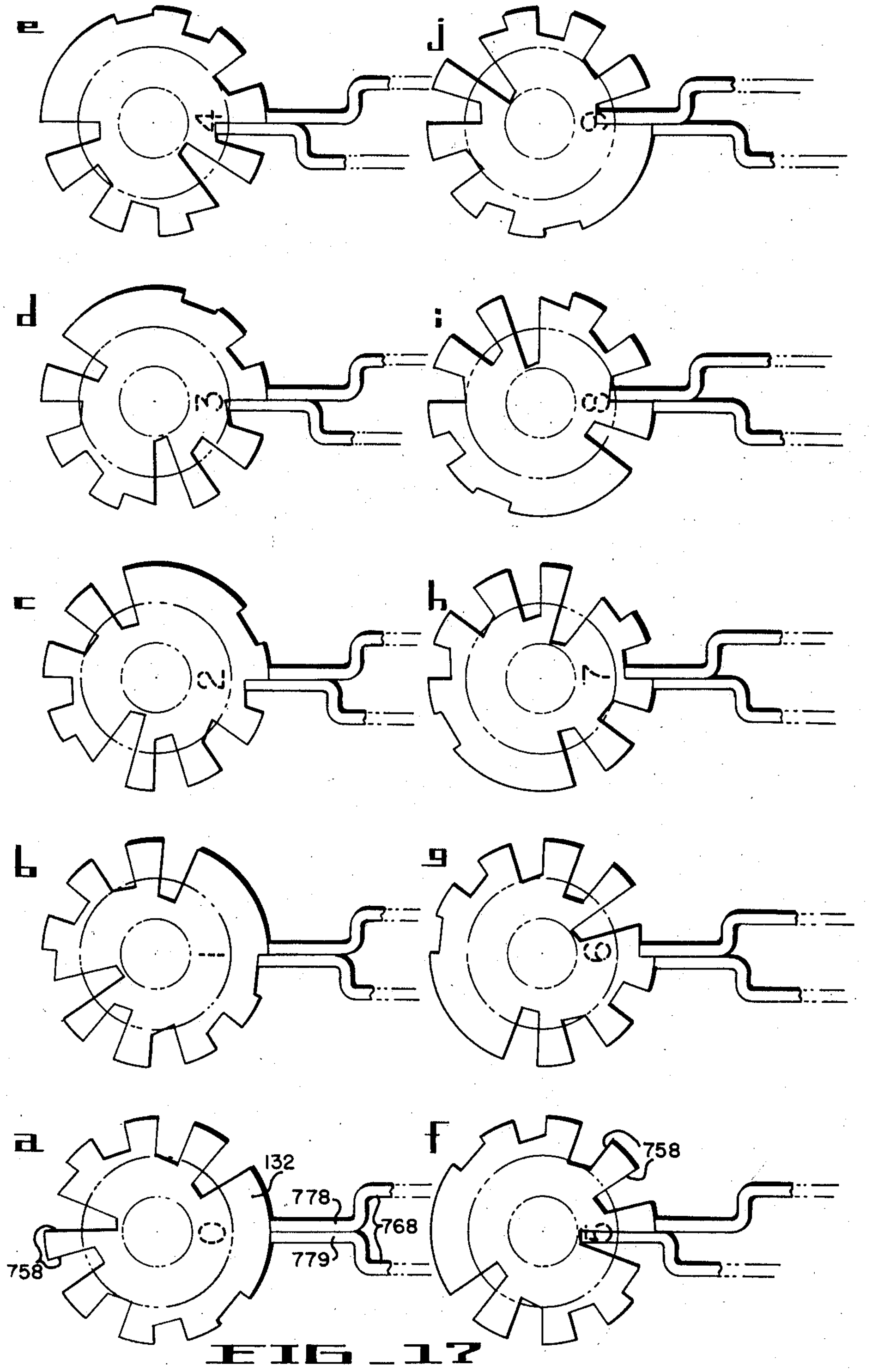

The sensing fingers 768 are arranged in pairs of left-hand and right-hand fingers corresponding to the pairs of selection bars 260. The rear end portions 778 and 779, Fig. 17*a*, of each pair of sensing fingers 768 are brought together and disposed in side-by-side relationship, as shown in Fig. 17.

When bail 772 is moved forwardly away from levers 763, as later explained, springs 773 resiliently urge the links 765 and sensing fingers 768 rearwardly to sense the value in the front register 116. The notches 758 of the first group of notches in each sensing cam 132 are angularly offset from the second group of notches in a manner such that only the left-hand finger 779 of each pair of sensing fingers will enter the notches of the first group of notches in the corresponding sensing cam and only the right-hand finger 768 will enter the notches of the second group, as is shown in Figs. 17*a* to 17*j*, inclusive. When a sensing finger enters a notch in the corresponding sensing cam 132, the lower link 770 to which the sensing finger is connected moves the associated selection bar 261 or 262 and the selection gear 147 or 148 to the position corresponding to the dial digit correlated to the notch, and any value standing in the front register is thus transferred back into the selection mechanism of the machine.

When the selection bars are moved in response to movement of the sensing fingers into notches in the corresponding sensing cams, the levers 573 and 575 and links 568 and 569 also set the printing selection gears 566 and 567 relative to the corresponding actuating cylinders 565 so that values transferred back from the register to the selection mechanism will be read into the printing mechanism and printed during the coincident cycle of the machine.

A plurality of ordinally arranged pairs of rear register sensing levers 780, Fig. 2*a*, are pivotally mounted intermediate their lengths on a shaft 781 extending transversely of the machine rearwardly of the rear register 117, the levers extending both above and below this shaft. Sensing fingers 782 are pivotally connected at their rear ends to the upper ends of the levers 780, one to each lever, and extend forwardly from the levers toward the edges of the corresponding rear register sensing cams 142. These fingers are arranged in pairs of side-by-side fingers with each pair opposed to a corresponding sensing cam, and extend through a fixed guide comb 783. Springs 784 connected one between each lever 780 and the comb 783 resiliently urge the fingers 782 toward the corresponding sensing cams 142. A bail, generally indicated at 785, having a cross-member 786 extending across the front edges of the levers 780 above the shaft 781 releasably holds the fingers 782 away from the cams 142. The bail has legs extending one from each end of crossbar 786 and secured at their lower ends to shaft 781, the right-hand leg being shown in Fig. 2*a*, and designated by 787, so that rocking of shaft 781, in a counter-clockwise direction as viewed in Fig. 2*a*, will move the crossbar 786 forwardly away from the forward edges of levers 780.

Links 788 are connected at their rearward ends to the lower ends of levers 780, one to each lever, and extend forwardly substantially parallel to the lower square shafts 564 below the lower selection gears 566 and 567. These links are arranged in pairs, each including a left-hand link 790 and a right-hand link 791, links 790 and 791 being slidably supported at their front ends in apertures provided in the lower portion of transverse frame plate 58. Each left-hand link 790 carries near its front end an upwardly projecting abutment formation 792 engaging the yoke 570 engaged with the corresponding front lower selection gear 566, and each right-hand link 791 is provided near its front end with an abutment formation 793 engaging the yoke 571 engaged with the corresponding rear lower selection gear 567. Movements of links 790 and 791 are transmitted to the selection slide bars 260 through links 568 and 569 and levers 573 and 575 and to upper selection gears 147 and 148 through the selection slide bars.

With this arrangement values sensed in the rear register by the sensing fingers 782 when bail 785 is rocked forwardly are back transferred into the selection mechanism of the machine.

As explained above, when any one of the control keys 241 to 246, inclusive, is depressed, the slide bar 620, Fig. 6, is shifted rearwardly a predetermined amount, to initiate machine operation, as above explained. Associated therewith at the rear end thereof, is a latch lever 795, Fig. 6, pivotally mounted at its lower end on a pivot pin 796 secured to plate 50 below and rearwardly of cam shaft 99, which latch lever extends upwardly from pivot pin 796 past the rear end of bar 620. The rear end of the bar engages a pin 797 projecting laterally from latch lever 795, so that the upper end of the latch lever is moved rearwardly whenever the bar 620 is shifted rearwardly. At its upper end latch lever 795 is provided with laterally projecting and spaced-apart abutments 798 and 799, Figs. 19 and 20. A bellcrank lever 800, Figs. 6 and 20, pivotally mounted at its angle on a pivot pin, or screw, 801 carried by side plate 50, has one arm 802 extending rearwardly from pivot pin 801 and resting at its rear end on abutment 798 of lever 795. The bellcrank lever has a second arm 804 extending upwardly from pivot pin 801 and provided near its upper end with a slot receiving a pin 805 projecting laterally from a link 806 pivotally connected at its rear end to the upper end of an arm 807 extending upwardly from one end of the bail 772. A cam follower 809 carried by lever arm 802 rides on cam 102 and, when lever arm 802 is released from abutment 798 and cam follower 809 rides into the depression of cam 102, the bail 772 is released and springs 773 move the sensing fingers 768 rearwardly to sense the positions of the front register sensing cams 142 and back transfer the value carried in the front register into the selection mechanism of the machine.

A lever 808, Fig. 19, secured at its front end to a shaft 810 extending transversely of the machine forwardly of, and parallel to, shaft 107, extends rearwardly from shaft 810 and rests at its rear end on abutment 799 of lever 795. As shown in Fig. 2, a plurality of ordinally arranged ratched toothed racks 812 are mounted, one on each selection slide bar 260 intermediate the length of the lower edges of the slide bars. Cooperating with the racks are a plurality of ordinally arranged dogs 814 including levers 811, pivotally mounted at their rear ends on shaft

810 and extending forwardly from this shaft, one below each rack 812. Guide comb 816 is mounted on, and rockable with, the shaft 810, and individual springs 815 connect each dog 814 to the comb 816 to resiliently raise the dogs, the dogs extending through the fixed guide comb 816 which holds them in alignment.

A detent formation 817 projects from the front end of each dog lever 811 for engagement with the teeth of the corresponding rack 812 to hold the selection bars 260 in the positions to which they are moved by the sensing fingers 768 or 782.

A cam follower 818, Fig. 18, is mounted on lever 808 near the rear end of this lever and is adapted to ride on cam 103, and, when lever 808 is released from abutment 799 and cam follower 818 rides off of the lobe of cam 103, the arms 811 are raised to lift the levers 811 and bring the detents 817 into engagement with the toothed racks 812, and releasably hold the selection slide bars in the position to which they are moved by the front or rear register sensing mechanism.

XIII. *Front register subtotal printing operation (Figs. 2, 2a, 4, 6 and 6a)*

When the front register subtotal key 242 is depressed, it shifts the control slide bar 620 rearwardly to release the levers 800, Fig. 6, and 808, Fig. 12, from the latch lever 795, so that the front register sensing fingers 768 will be freed to move rearwardly and sense the sensing cams 132, back transferring the value standing in the front register into the selection mechanism and releasably locking the value in the selection mechanism. At the same time the control bar 694 is shifted forwardly to release the bellcrank lever 680, Fig. 20, to neutralize the drives of both registers. Forward movement of bar 694 also establishes an operating cycle of the machine in which the value back transferred from the front register into the selection mechanism is printed during the first half of this coincident operating cycle. The key 242, when initially depressed, is latched down by bar 648 and this coincidentally clears the machine keyboard. Cam 92, Fig. 6*a*, operating through levers 612 and 610 places the printing mechanism drive in positive gear during the first half of the cycle to read out and print the subtotal value, and in negative gear during the last half of the cycle to zeroize the printing mechanism.

At the end of the cycle, the stud 688 on cam 102, Fig. 19, moves the latch-down bar 648 to release the key 242, and return of the key to its raised position releases the bars 620 and 694 for forward and rearward movement, respectively, to their full-cycle positions. The cams 102 and 103 restore the levers 800 and 808, Fig. 18, to the condition in which they are latched against movement by the latch lever 795, so that all moving parts are restored to their full-cycle position at the end of a front register subtotal printing cycle.

The front register total printing cycle is exactly the same as described above for the subtotal printing cycle, except that when the total key is depressed it moves the bar 674 also, to activate the front register clearing or zeroizing mechanism as described above.

XIV. *Rear register subtotal and total printing operation (Figs. 2, 2a, 4, 19 and 19a)*

When the rear register subtotal key 246 is depressed, it is latched down by bar 648, to be released at the end of the coincident cycle of operation. The depression of the key shifts the bar 620 rearwardly to establish the operating cycle and release the levers 800 and 808. It also shifts the bar 694 forwardly to neutralize the front and rear register drives. When this key is depressed, the tongue 702 enters a notch 820 in link 806 and holds the front register sensing fingers 768 against movement, even though lever 800 is released. Further, the stud 643 carried by the stem 637 of this key engages the forward portion of a lever 821, pivotally mounted intermediate its length on a pivot pin, or screw, 822 carried by plate 50 rearwardly of key stem 637, and rocks lever 821, in a counter-clockwise direction as viewed in Fig. 19.

Lever 821 is provided at its rear end with a hook formation 823. A bellcrank lever 825, see also Fig. 19*a*, mounted at its angle on a pivot pin 826 carried by plate 50 below cam shaft 90, has an upwardly and forwardly directed arm 827 carrying at its upper end a laterally projecting pin 828 engaged by the hook formation 823. Lever 825 also has an upwardly and rearwardly directed arm 830 (Fig. 19*a*) carrying near its distal end a laterally projecting pin 831 received in a slot 832 in the forward end portion of a lever arm 833 secured at its rear end on shaft 781 by a fastening screw 834. A cam follower 835 mounted on bellcrank lever arm 827 rides on the peripheral edge of cam 95 and, when hook 823 is raised from pin 828 by depression of key 246 and cam follower 835 rides into the low portion of cam 95, spring 836 rocks levers 825 and 833 and bail 785 to free the levers 780 for movement of rear register sensing fingers 782 into engagement with rear register sensing cams 142 by springs 784. This movement of sensing fingers 782 back transfers the value standing in the rear register into the selection mechanism and prints the value in the manner described above.

At the end of the cycle, the key 246 is released, releasing the bars 620 and 694 and the bellcrank lever 821, and the cam 95 (Fig. 19*a*) then restores the lever 825 to latched condition, whereby all moving parts are restored to full-cycle, or home, position at the end of the rear register subtotal printing cycle.

When the rear register total key 245, Fig. 19, is depressed, it shifts the bar 620 rearwardly and the bar 694 forwardly and rocks the lever 821, by engagement of pin 642 with this lever, to release the bellcrank lever 825, with the results described above. A laterally projecting tongue 837 on the key stem 636 enters a notch 838 in the upper edge of link 806 to hold the front register sensing fingers 768 out of operation. The pin, or stud, 701 on the rear register total key stem 636 also rocks the lever 705, 205 to release the rear register clearing lever 200 for operation in the manner described above. Except for this clearing of the rear register and restoration of the clearing lever 200, Fig. 19*a*, to latched condition by cam 94, the rear register total printing operation is the same as the rear register subtotal printing operation.

XV. *Positive and negative transfer operation (Figs. 20 and 20a)*

When the positive transfer key 243 is depressed, bar 620 is shifted rearwardly, establishing an operating cycle of the machine and unlatching levers 800 and 808, and the bar 674 is shifted forwardly to rock bellcrank 680 and its integral latch lever 190 on the pivot 681 and thereby unlatch the front register clearing lever 184. However, the bar 694 is not moved, so that the lever 705 is not unlatched to neutralize the register drives. Rocking of lever 752 by stud 691, as described above, causes notch 755 on the rear end thereof to engage pin 497, Fig. 12, of latch lever 490, thereby latching the lever 490 to render lever 505 (Fig. 12) ineffective to neutralize the register drives during the last half of the operating cycle and unlatches bellcrank lever 731 to rock lever 743 to place the front register drive in neutral and the rear register drive in positive gear during the first half of the operating cycle.

With the levers 800 and 808 unlatched, as soon as the lobes of cams 102 and 103 ride from under the cam followers 809 and 818 carried respectively by these levers, the sensing fingers 768 will move rearwardly to sense the front register sensing cams 132 and will back transfer the value standing in the front register into the selection mechanism of the machine. This value will be temporarily latched in the selection mechanism by the dogs 814 which have been conditioned to engage the corresponding racks 812 by the release of lever 808 from the latch lever 795 and the lobe of cam 103. The actuator drums are set ahead of the corresponding selection gears when in full-cycle position by an angle sufficient for the sensing mechanism to set the selection mechanism before the actuator drums turn to a position to engage the selection gears. Since the rear register drive is now held in positive gear, the value back transferred into the selection mechanism will be entered into the rear register during the first half of the operating cycle and will also be entered into the print wheels of the printing mechanism and printed. During the last half of the operating cycle, the print wheels are zeroized in the manner described above, and the rear register drive is neutralized by the riding of cam follower 741 onto the lobe portion of cam 101. It will be noted that, at the trailing end of its lobe portion, cam 101 has a high point which engages the cam follower 741 at the end of the machine operating cycle and relatches the bellcrank lever 731 with the hook at the rear end of latch lever 752 as the key 243 is released from the latch-down bar 648 to return to its raised position. The front register is cleared by cam 93 during this last half of the operating cycle and the lever 184 is relatched by the hook 191 of the latch lever 680 when the key 243 rises. The bar 674 is moved rearwardly to its full-cycle position by spring 840 connected between plate 50 and arm 190 of lever 680.

During the last half of the cycle, the cam 102 raises the rear end of bellcrank lever 800, thereby withdrawing sensing fingers 768 from front register sensing cams 132, and cam 103 raises the rear end of lever 808, thereby retracting dogs 814 and freeing the selection slide bars to return to their "0" positions. When key 243 rises and bar 620 is moved forwardly to its full-cycle position by spring 644, the rear ends of levers 800 and 808 are relatched on the corresponding abutments 798 and 799 of latch lever 795, and all of the moving parts are then restored to their home, or full-cycle, position with the front register cleared and the value which was standing in the front register positively transferred to the rear register.

When the negative transfer key 244 is depressed, the bar 674 is shifted forwardly to release the front register clearing lever 184, the bar 620 is shifted rearwardly to establish a machine operating cycle and releasing the levers 800 and 808 to sense the front register and latch the value standing in the front register in the selection mechanism, and the lever 753 is rocked to release the pin 736 carried by three-armed lever 730 from the hook formation 754 of lever 753.

When bellcrank lever 730 is released, spring 750 rocks this lever and the gate positioning lever 742 to place the front register drive in neutral and the rear register drive in negative gear.

Under these conditions, the value standing in the front register is sensed by the sensing fingers 768, back transferred to the selection mechanism, subtractively entered into the rear register, entered into the printing mechanism and printed during the first half of the coincident operating cycle. During the second half of the operating cycle, the printing mechanism is zeroized, the front register cleared and the moving parts returned to their home, or full-cycle, position, in the manner described above.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A calculating machine comprising selection mechanism including a full keyboard, at least two accumulating registers each including a plurality of rotatable dial assemblies in ordinal arrangement, actuator mechanism effective to enter values set up in said selection mechanism into said registers, manually settable means effective to condition said actuator mechanism to select one or the other of said registers for the entry of values therein and to enter such values either additively or subtractively into the selected register, power means effective to drive said actuator mechanism through successive operating cycles, means actuated by the depression of any one of a plurality of live keyboard keys to energized said power means and establish an operating cycle of said actuator mechanism, and means effective to back transfer values from at least one of said registers into said selection mechanism including sensing cams mounted one on each of the dial assemblies of said one register and each having therein angularly spaced-apart notches of different depths corresponding to the digit values of the dial assemblies, ordinally arranged sensing fingers connected to said selection mechanism and having end portions receivable in the notches in the corresponding sensing cams to read out a value carried in said register and transfer such value into the selection mechanism, manually actuated means effective to enable said power means to cycle said actuator mechanism, means engaged by said manually actuated means to enable said power means to move said sensing fingers into and out of engagement with said sensing cams, latch means effective to releasably hold said selection mechanism in differentially set condition, and means rendered effective by said manually actuated means to enable said power means to move said latch means into and out of operative position during the coincident operating cycle of said actuator mechanism.

2. In calculating mechanism a support, rotatable members journalled by said support and each having a reference position, power means effective to turn said rotatable members away from said reference position to register values in said mechanism, abutment elements carried one by each of said rotatable members, sensing members carried by said support for movement toward and away from said abutment elements and arranged in pairs of side-by-side members with one pair of sensing members disposed in opposition to each rotatable abutment element, each sensing member having an abutment portion and all of said sensing members having a reference position in which the abutment portions thereof are spaced from the corresponding abutment elements and each of said rotatable abutment elements having angularly spaced-apart abutment portions spaced from the abutment portions of the corresponding pairs of sensing members when the latter are in their reference position different distances correlated to the angular departure of said rotatable members from the reference position thereof when the abutment portions of the abutment elements are brought into opposition to the abutment portions of the corresponding sensing members, the abutment portions of each abutment element being arranged in separate series angularly related so that the abutment portion of one of the corresponding pair of sensing members is engageable with one series only and the abutment portion of the other of said corresponding pair of sensing members is engageable with the other series only of the abutment portions of each rotatable abutment element, selection mechanism, means including power driven cam means connected to said sensing members and effective at times to resiliently urge said sensing members toward said rotatable abutment elements to provide a departure of one member of each pair of sensing members from the reference position of said sensing members commensurate with the angular departure of the corresponding rotatable member from the reference position thereof, and means connecting said sensing members ordinally to said selection mechanism.

3. In a calculating machine comprising selection mechanism including a full keyboard, at least one totalizing register, printing mechanism, actuating mechanism operating said register and said printing mechanism under control of said selection mechanism, power means effective to cycle said actuating mechanism, register drive means effective to alternatively provide an additive, a subtractive or an interrupted drive between said actuating mechanism and said register, at least one live key effective each time it is depressed to enable said power means to drive said actuating mechanism through one complete operating cycle, manually settable means effective to condition said register drive means for additive or subtractive operation of said register, and clearing mechanism effective to zeroize said register at the end of predetermined operating cycles of said actuation mechanism; transfer mechanism effective to sense a value standing in said register and set said selection mechanism to the same value, and manually actuatable control means effective when actuated to interrupt said register drive, enable said transfer mechanism to set said selection mechanism to the value standing in said register, cycle said actuating mechanism to print the value back transferred to said selection mechanism, disable said transfer mechanism and release said selection mechanism to return to its "0" condition, and enable said register clearing mechanism to zeroize said register.

4. In a calculating machine, a support, selection mechanism carried by said support and including a keyboard and ordinally arranged selection slides movable to differentially set positions by the keys of said keyboard, a register carried by said support and including ordinally arranged and rotatable dials, actuator shafts journalled in said support, power means drivingly connectable to said actuator shafts to impart successive operational cycles thereto, a first Thomas type actuator drum on each actuator shaft, dial drive shafts extending above and parallel to said actuator shafts and disposed coordinally of said selection slides and said register dials, a reversible and interruptable driving connection between each dial drive shaft and the coordinal register dial, at least one selection gear drivingly and slidably mounted on each dial drive shaft and connected to the coordinal selection slide for selective driving engagement with the associated actuator drum to drive the dial drive shaft through an angular increment corresponding to the value of a digit key used to set the coordinal selection slide, and manually actuatable means effective to enable said power means to drive said actuator shafts; printing mechanism carried by said support and including printing elements arranged coordinally of said selection slides, printing element drive shafts extending below and parallel to said actuator shafts and arranged coordinally of said selection slides and said printing elements, a reversible driving connection between each printing element drive shaft and the coordinal printing element, a second Thomas type actuator drum on each actuator shaft, at least one selection gear drivingly and slidably mounted on each printing element drive shaft for selective engagement with the associated second actuator drum, and means connecting the selection gear on each printing element drive shaft with the coordinal selection slide for selectively engaging the selection gear with the associated second actuator drum to impart to the associated printing element drive shaft an angular increment of rotation corresponding to the value of a digit key operated to set the coordinal selection slide.

5. In a calculating machine having a support, selection mechanism carried by said support and including a keyboard and ordinally arranged selection slides movable to differentially set positions by the digit keys of said keyboard, a register carried by said support and including ordinally arranged and rotatable register dials, actuator shafts journalled in said support, power means carried by said support, manually actuatable means effective to enable said power means to impart successive operating cycles to said actuator shafts, at least one Thomas type actuator drum on each actuator shaft, dial drive shafts extending along and parallel to said actuator shafts and disposed coordinally of said selection slides and said register dials, and at least one selection gear drivingly and slidably mounted on each dial drive shaft and connected to the coordinal selection slide for selective engagement with the adjacent actuator drum to impart to the associated drive shaft an angular increment of rotation corresponding to the value of the digit key operated to set the associated selection slide, the combination which comprises a reversible and interruptable driving connection between each register dial drive shaft and the coordinal dial, a printing mechanism carried by said support and including operable printing elements arranged coordinally with said register dials and selection slides, printing element drive shafts extending along and parallel to said actuator shafts and coordinally related to said printing elements, a reversible driving connection between each printing element drive shaft and the coordinal printing element, at least one selection gear drivingly and slidably mounted on each printing element drive shaft, and means operatively connecting each printing element drive shaft selection gear with the coordinally related selection slide for selective engagement with the adjacent actuator drum to impart to the associated printing element drive shaft an angular increment of rotation corresponding to the value of the digit key operated to set the associated selection slide, whereby said printing elements are driven synchronously and coextensively with said register dials.

6. In a calculating machine having a support, selection mechanism carried by said support and including a keyboard and ordinally arranged selection slides movable to differentially set positions by the digit keys of said keyboard, a register carried by said support and including ordinally arranged and rotatable register dials, actuator shafts journalled in said support, power means carried by said support, manually actuatable means effective to enable said power means to impart successive operating cycles to said actuator shafts, Thomas type actuator drums on said actuator shafts, dial drive shafts extending along and parallel to said actuator shafts and disposed coordinally of said selection slides and said register dials, and selection gears drivingly and slidably mounted on said dial drive shafts and connected to the coordinal selection slide for selective engagement with the adjacent actuator drum to impart to the associated drive shaft an angular increment of rotation corresponding to the value of the digit key operated to set the associated selection slide, the combination comprising a reversible and interruptable driving connection between each register dial drive shaft and the coordinal dial, a printing mechanism carried by said support and including operable printing elements arranged coordinally with said register dials and selection slides, printing element drive shafts extending along and parallel to said actuator shafts and coordinally related to said printing elements, a reversible driving connection between each printing element drive shaft and the coordinal printing element, selection gears drivingly and slidably mounted on said printing element drive shafts, means connecting each printing element drive shaft selection gear with the coordinally related selection slide for selective engagement with the adjacent actuator drum to impart to the associated printing element drive shaft an angular increment of rotation corresponding to the value of the digit key operated to set the associated selection slide whereby said printing elements are driven synchronously and coextensively with said register dials, means drivingly connecting said power means to said actuator shaft effective to impart two complete rotations to said actuator shafts during each operating cycle of said power means, means interrupting the driving connection between said dial drive shafts and said register dials during the second rotation of said actuator shafts in each operating cycle, and means reversing the drives between said printing element drive shafts and said printing elements during the second rotation of said actuator shafts to leave said printing elements in a zeroized condition at the end of each operating cycle of said power means.

7. In a calculating machine, a support, selection mechanism carried by said support and including a keyboard and ordinally arranged selection slides movable to differentially set positions by the digit keys of said keyboard, a register carried by said support and including ordinally arranged and rotatable register dials, actuator shafts journalled in said support, power means carried by said support, manually actuatable means effective to enable said power means to impart successive operating cycles to said actuator shafts, at least one Thomas type actuator drum on each actuator shaft, dial drive shafts extending along and parallel to said actuator shafts and disposed coordinally of said selection slides and said register dials, at least one selection gear drivingly and slidably mounted on each dial drive shaft and connected to the coordinal selection slide for selective engagement with the adjacent actuator drum to impart to the associated drive shaft an angular increment of rotation corresponding to the value of the digit key operated to set the associated selection slide, a reversible and interruptable driving connection between each register dial drive shaft and the coordinal dial, a printing mechanism carried by said support and including operable printing elements arranged coordinally with said register dials and selection slides, printing element drive shafts extending along and parallel to said actuator shafts and coordinally related to said printing elements, a reversible driving connection between each printing element drive shaft and the coordinal printing element, at least one selection gear drivingly and slidably mounted on each printing element drive shaft, means connecting each printing element drive shaft selection gear with the coordinally related selection slide whereby said printing elements are driven synchronously and coextensively with said register dials, means drivingly connecting said power means to said actuator shaft effective to impart two complete rotations to said actuator shafts during each operating cycle of said power means, means interrupting the driving connection between said dial drive shafts and said register dials during the second rotation of said actuator shafts in each operating cycle, means reversing the drives between said printing element drive shafts and said printing elements during the second rotation of said actuator shafts to leave said printing elements in a zeroized condition at the end of each operating cycle of said power means, transfer mechanism effective during the first rotation of said actuator shafts in an operative cycle of said power means to interrupt the drive between said dial drive shafts and said register dials, to sense the value standing in said register and differentially set said selection slides for entry of said value in said printing mechanism during said first rotation of said actuator shafts, manually actuatable means effective to enable said transfer mechanism, and means effective to zeroize said register dials during the second rotation of said actuator shafts while said printing elements are being zeroized.

8. In a calculating machine including a selection mechanism, a register including ordinally arranged dial assemblies, a first set of Thomas type actuators, and differentially positionable interponent gearing positioned by said selection mechanism and effective to connect said first set of actuators to said dial assemblies for differential operation of said dial assemblies by said actuators to enter selected values in said register, an ordinally arranged printing mechanism, a second set of Thomas type actuators, a second set of differentially positionable gearing positioned by said selection mechanism and effective to connect said second set of actuators to said printing mechanism to enter the selected values into said printing mechanism, means for operating the printing mechanism to print the values so entered thereinto, and reversing means in said second set of interponent gearing effective to reverse the drive of the printing mechanism from the second set of actuators, and means for operating the reversing means at the end of the printing operation and thereby return said printing mechanism to "0" after printing of the selected value.

9. In a calculating machine having an ordinally arranged selection mechanism including in each order a pair of differentially positionable selection bars, a register including ordinally arranged shafts, an ordinally arranged digitating means controlled by said selection means for differentially rotating said shafts, a single value cam mounted on each of said shafts, ordinally arranged pairs of sensing fingers mounted for movement toward and away from the said respective value cams and having abutment portions adjacent and opposed to its respective value cam, said sensing fingers having a home position substantially at the limit of their movement away from their respective value cams, two series of differential notches in said value cams, one said series of notches being so arranged angularly as to be engaged by one of the respective pair of sensing members and the other series of notches being so arranged angularly as to be engaged by the other of the respective pair of sensing members, and the notches of each series being separated from the other notches of its series by an abutment portion blocking operation of the noncooperating sensing member, means for resiliently biasing all of said sensing fingers toward their respective value cams to bring the abutment portions of said sensing fingers into engagement with one or the other series of notches or abutments and thereby differentially position said sensing fingers in correlation to the angular positions of said shafts relative to the corresponding sensing fingers, means connecting said sensing fingers to said selection mechanism to differentially set the selection mechanism by said sensing fingers, and means for latching said selection mechanism in its differentially set position.

10. A value sensing mechanism for a calculator register having a plurality of ordinally arranged and rotatably mounted register wheels, a single cam member rigidly mounted on each register wheel and having a reference angular position, ordinally arranged pairs of sensing members mounted for movement toward and away from the respective cam members, each sensing member having an abutment portion opposed to its respective cam member and having a reference position in which the abutment portions thereof are spaced from said cam member, two series of differential cam notches in each cam member, one of said series of notches being so arranged as to be engaged by one of the respective pair of sensing members and the other series of notches being so arranged as to be engaged by the other of the respective pair of sensing members, the notches of each series of notches being separated from the other notches of its series by an abutment portion blocking operation of the non-cooperating sensing member whereby the abutment portion of one of said sensing members is engageable only with one series of notches or the abutment portion of the other series of notches and the abutment portion of the other of said sensing members is engageable only with the other series of notches or the abutment portion of the first series of notches, and means connected to said sensing members and effective to resiliently urge said sensing members toward said cam member to provide a departure of only one of each pair of said sensing members from the reference position of said sensing members commensurate with the angular departure of said cam member from the reference position thereof.

11. In a calculating machine having ordinally arranged pairs of selection bars, one bar for one group of digital values and the other bar for the other digital values, and a plurality of ordinally arranged and rotatably mounted register wheels, a mechanism comprising a single value cam rigidly mounted on each register wheel, said cams having angular value positions corresponding to the various digital values, ordinally arranged pairs of sensing members mounted for movement toward and away from the respective cams, each sensing member having an abutment portion opposed to its respective cam and having a reference position in which the abutment portions thereof are spaced from said cam, two series of relatively offset differential value notches and intermediate abutments in said cams, one said series of notches for said one group of digital values and abutments for the other group of digital values so arranged as to be engaged by one of the coordinal pair of sensing members and the other series of notches for the other group of digital values and abutments for the said one group of digital values so arranged as to be engaged by the other of the coordinal pair of sensing members, whereby the abutment portion of one of said sensing members is engageable only with one series of notches or the abutments of the other series of notches and the abutment portion of the other of said sensing members is engageable only with the other series of notches or the abutments of the first series of notches, means for connecting the sensing members engageable with the first series of notches with the coordinal selection bars for the first group of digital values and for connecting the other sensing members with the other coordinal selection bars, and means connected to said sensing members and effective to resiliently urge said sensing members toward said cams to provide a departure of one of each pair of said sensing members from the reference position of said sensing members corresponding to the digital value position of the coordinal register wheel.

12. In a calculating machine having a selection mechanism including a keyboard and ordinally arranged selection bars movable to differentially set positions by the digit keys of said keyboard, a register including ordinally arranged and rotatable register dials, actuator shafts, cyclically operable power means effective to impart rotation to said actautor shafts, Thomas-type actuator drums on said actuator shafts, ordinally arranged dial drive shafts extending along and parallel to said actuator shafts, and selection gears drivingly and slidably mounted on said dial shafts and connected to the coordinal selection bar for selective engagement with the adjacent actuator drum to impart to the associated drive shaft an angular increment of rotation corresponding to the value of the digit key operated to set the associated selection bar, the combination comprising ordinally arranged printing element drive shafts extending along and parallel to said actuator shafts, selection gears drivingly and slidably mounted on said printing element drive shafts and connected to the coordinal selection bar for selective engagement with the adjacent actuator drum to impart to the associated printing element drive shaft an angular increment of rotation corresponding to the value of the digit key operated to set the associated selection slide, a reversible and interruptable driving connection between each register dial drive shaft and the coordinal dial, a printing mechanism including ordinally arranged printing elements, a reversible driving connection between each printing element drive shaft and the coordinal printing element, and a manually operated means to initiate operation of said power means for a cycle of operation, to interrupt said interruptable driving connection at a predetermined point in said cycle, and to reverse said reversible driving connection at approximately said predetermined point of said cycle.

References Cited in the file of this patent

UNITED STATES PATENTS

| | | |
|---|---|---|
| 897,659 | Rein | Sept. 1, 1908 |
| 1,041,576 | Behr | Oct. 15, 1912 |
| 1,058,303 | Herztark | Apr. 8, 1913 |
| 1,208,288 | Carlin | Dec. 12, 1916 |
| 1,941,309 | Koch | Dec. 26, 1933 |
| 2,052,905 | Sturm | Sept. 1, 1936 |
| 2,226,451 | Sturm | Dec. 24, 1940 |
| 2,305,780 | Henzelmann | Dec. 22, 1942 |
| 2,399,170 | Chase | Apr. 30, 1946 |
| 2,552,789 | Hopkins | May 15, 1951 |
| 2,586,420 | Ellerbeck | Feb. 19, 1952 |
| 2,654,539 | Brubaker et al. | Oct. 6, 1953 |
| 2,660,374 | Hopkins et al. | Nov. 24, 1953 |
| 2,794,596 | Ellerbeck | Jan. 4, 1957 |

FOREIGN PATENTS

| | | |
|---|---|---|
| 203,473 | Switzerland | June 16, 1939 |